United States Patent
Yang et al.

(10) Patent No.: US 11,477,675 B2
(45) Date of Patent: Oct. 18, 2022

(54) UPLINK CANCELLATION INDICATION CAPABILITY SIGNALING

(71) Applicant: QUALCOMM Incorporated, San Diego, CA (US)

(72) Inventors: Wei Yang, San Diego, CA (US); Peter Gaal, San Diego, CA (US); Seyedkianoush Hosseini, San Diego, CA (US); Seyed Ali Akbar Fakoorian, San Diego, CA (US); Wanshi Chen, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 17/069,605

(22) Filed: Oct. 13, 2020

(65) Prior Publication Data

US 2021/0112432 A1 Apr. 15, 2021

Related U.S. Application Data

(60) Provisional application No. 62/914,862, filed on Oct. 14, 2019.

(51) Int. Cl.
*H04W 72/04* (2009.01)
*H04W 24/08* (2009.01)
*H04W 8/24* (2009.01)

(52) U.S. Cl.
CPC ............ *H04W 24/08* (2013.01); *H04W 8/24* (2013.01); *H04W 72/042* (2013.01); *H04W 72/0446* (2013.01)

(58) Field of Classification Search
CPC ............ H04W 24/08; H04W 72/1268; H04W 72/042; H04W 72/14; H04W 8/24;
(Continued)

(56) References Cited

U.S. PATENT DOCUMENTS 9,729,295 B2 * 8/2017 Zhang ................... H04L 1/1861
2017/0331670 A1 11/2017 Parkvall et al.
(Continued)

FOREIGN PATENT DOCUMENTS

WO WO-2019160332 A1 8/2019

OTHER PUBLICATIONS

Intel Corporation: "On Inter-UE UL Multiplexing for eURLLC", 3GPP Draft, 3GPP TSG RAN WG1 Meeting #96, R1-1902497 Intel—UL Inter-UE MUX, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600193, 12 Pages, Retrieved from the Internet: URL: http://www.3gpp.org/ftp/tsg%5Fran/WG1%5FRL1/TSGR1%5F96/Docs/R1%2D1902497%2Ezip, [retrieved on Feb. 16, 2019], p. 6, line 40-line 55.
(Continued)

*Primary Examiner* — Wei Zhao
(74) *Attorney, Agent, or Firm* — Liem T. Do

(57) ABSTRACT

Methods, systems, and devices for wireless communications are described. A UE may identify a capability for downlink control channel monitoring and uplink cancellation indication monitoring. The UE may transmit, to a base station, an indication of the identified uplink cancellation indication monitoring capability. The base station may receive the indication from the UE, and may configure monitoring occasions in a slot based on the received uplink cancellation indication monitoring capability. The base station may transmit via radio resource control signaling, and the UE may receive, a configuration which configures a number of monitoring occasions based on the uplink cancellation indication monitoring capability. The UE may then monitor the
(Continued)

configured monitoring occasions according to the identified capability.

30 Claims, 17 Drawing Sheets

(58) Field of Classification Search
CPC .... H04W 76/36; H04L 5/0048; H04L 1/1825; H04L 1/1822
See application file for complete search history.

(56) References Cited

U.S. PATENT DOCUMENTS

| | | | |
|---|---|---|---|
| 2018/0352582 A1 | 12/2018 | Yi et al. | |
| 2019/0363843 A1* | 11/2019 | Gordaychik | .......... H04W 52/58 |
| 2021/0376985 A1* | 12/2021 | Zhou | ..................... H04L 5/0053 |

OTHER PUBLICATIONS

International Search Report and Written Opinion—PCT/US2020/055560—ISA/EPO—dated Feb. 1, 2021.

MCC Support: "Final Report of 3GPP TSG RAN WG1 #98 v2.0.0 (Prague, Czech Rep, Aug. 26-30, 2019)", 3GPP TSG RAN WG1 Meeting #98bis, R1 -1911429, Final_Minutes_Report_RAN1#98_V200, 3rd Generation Partnership Project (3GPP), Mobile Competence Centre, 650, Route Des Lucioles, F-06921 Sophia-Antipolis Cedex, France, vol. RAN WG1, No. Chongqing, China; Oct. 14, 2019-Oct. 18, 2019, Oct. 12, 2019 (Oct. 12, 2019), 180 Pages, XP051807965, Retrieved from the Internet: URL: https://ftp.3gpp.org/tsg_ran/WG1_RL1/TSGR1_98/Report/Final_Minutes_report_RAN1%2398_v200.zip Final_Minutes_report_RAN1#98_v200.docx [retrieved on-Oct. 12, 2019] p. 97, line 40-line 45, p. 107, line 13-line 17, p. 44, line 50-line 55.

Nokia, et al., "UL Inter-UE eMBB and URLLC Multiplexing Enhancements", 3GPP TSG RAN WG1 Meeting #98-Bis, R1-1910868 NR_URLLC_Inter_UE_MUX_Chongqing_Final, 3rd Generation Partnership Project (3GPP), Mobile Competence Centre; 650, Route Des Lucioles; F-06921 Sophia-Antipolis Cedex; France, vol. RAN WG1, No. Chongqing, China; Oct. 14, 2019-Oct. 20, 2019, Oct. 7, 2019 (Oct. 7, 2019), 16 Pages, XP051808982, Retrieved from the Internet: URL: https://ftp.3gpp.org/tsg_ran/WG1_RL1/TSGR1_98b/Docs/R1-1910868.zip R1-1910868_NR_URLLC_Inter_UE_mux_Chongqing_final.doc [retrieved on Oct. 7, 2019] p. 8, line 25-line 40.

* cited by examiner

UPLINK CANCELLATION INDICATION CAPABILITY SIGNALING

CROSS REFERENCE

The present Application for Patent claims the benefit of U.S. Provisional Patent Application No. 62/914,862 by YANG et al., entitled "UPLINK CANCELLATION INDICATION CAPABILITY SIGNALING," filed Oct. 14, 2019, assigned to the assignee hereof, and expressly incorporated by reference herein.

FIELD OF TECHNOLOGY

The following relates generally to wireless communications and more specifically to uplink cancellation indication capability signaling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communication systems, such as NR systems, communication devices such as base stations and UEs may support data transmissions over configured resources of a channel according to different latency and reliability requirements for the transmitted data. For example, the communication devices may support ultra-reliable low latency (URLLC) communication for reducing latency and increasing reliability for network communications. In addition, the network may also use eMBB communications which may support high data rates and wide coverage, but may have increased latency and decreased reliability as compared to URLLC communications. The coexistence of both URLLC and eMBB communications on the same radio resources may pose problems due to a trade-off between various communication requirements.

SUMMARY

The described techniques relate to improved methods, systems, devices, and apparatuses that support uplink cancellation indication capability signaling. In some examples, a user equipment (UE) may be configured to monitor a channel or a set of resources for uplink cancellation indication (ULCI) at a greater frequency than it may monitor for other downlink control information (DCI) (e.g., such as scheduling DCI including uplink or downlink grants) during a given slot. In some cases, the UE may report or otherwise indicate to the network a capability for monitoring for ULCI at greater frequencies, which may improve communications using ULCI within the network.

In one example, a UE may identify a downlink control channel monitoring capability, which may in some cases be a capability for monitoring for a physical downlink control channel (PDCCH). This monitoring capability may in some cases indicate a number of monitoring occasions that the UE may use to monitor for downlink control messages or DCI. In some cases, the UE may be capable of monitoring for downlink control messages in a single occasion within a slot. In some other cases, the UE may be capable of monitoring for downlink control messages during multiple occasions within a slot. A UE may transmit or otherwise indicate its capability for monitoring downlink control messages to the network.

In addition to the downlink control channel monitoring capability, the UE may identify its capabilities to monitor for ULCI within a given slot. In some examples, the UE may be able to monitor for ULCI during multiple monitoring occasions in a slot. The UE may explicitly or implicitly indicate its capability to monitor ULCIs during a slot to a base station or other network entity. The base station may receive the indication of the UE's ULCI monitoring capability, and may configure a number of monitoring occasions for ULCIs based at least in part on the UEs indicated capability. Then, the base station may transmit a configuration via radio resource control (RRC) messaging which may configure the number of monitoring occasions based on the UEs capability to monitor for ULCI. After receiving the RRC signaling from the base station, the UE may monitor for ULCIs in the configured monitoring occasions.

A method of wireless communications at a UE is described. The method may include identifying a downlink control channel monitoring capability for the UE, transmitting, to a base station, an indication of an uplink cancellation indication (ULCI) monitoring capability, and monitoring for ULCIs in monitoring occasions based on the ULCI monitoring capability.

An apparatus for wireless communications at a UE is described. The apparatus may include a processor, memory coupled with the processor, and instructions stored in the memory. The instructions may be executable by the processor to cause the apparatus to identify a downlink control channel monitoring capability for the UE, transmit, to a base station, an indication of an uplink cancellation indication (ULCI) monitoring capability, and monitor for ULCIs in monitoring occasions based on the ULCI monitoring capability.

Another apparatus for wireless communications at a UE is described. The apparatus may include means for identifying a downlink control channel monitoring capability for the UE, transmitting, to a base station, an indication of an uplink cancellation indication (ULCI) monitoring capability, and monitoring for ULCIs in monitoring occasions based on the ULCI monitoring capability.

A non-transitory computer-readable medium storing code for wireless communications at a UE is described. The code may include instructions executable by a processor to identify a downlink control channel monitoring capability for the UE, transmit, to a base station, an indication of an uplink cancellation indication (ULCI) monitoring capability, and monitor for ULCIs in monitoring occasions based on the ULCI monitoring capability.

Some examples of the method, apparatuses, and non-transitory computer-readable medium described herein may further include operations, features, means, or instructions for receiving a configuration in a radio resource control message which configures ULCI monitoring occasions based on the ULCI monitoring capability.

Some examples of the method, apparatuses, and non-transitory computer-readable medium described herein may further include operations, features, means, or instructions for identifying that the downlink control channel monitoring capability indicates a capability of monitoring for downlink control channel messages during a single monitoring occasion per slot, and transmitting an indication of a capability of monitoring for ULCIs during multiple monitoring occasions per slot based on the identifying.

In some examples of the method, apparatuses, and non-transitory computer-readable medium described herein, the indication of a capability of monitoring for ULCIs during multiple monitoring occasions per slot includes an indication of a monitoring span gap and an indication of a monitoring span length.

Some examples of the method, apparatuses, and non-transitory computer-readable medium described herein may further include operations, features, means, or instructions for monitoring for ULCIs during a set of monitoring occasions per slot, and monitoring for downlink control channel messages during a single monitoring occasion per slot, where the downlink control channel messages include control signaling that may be different from the ULCIs.

Some examples of the method, apparatuses, and non-transitory computer-readable medium described herein may further include operations, features, means, or instructions for transmitting an indication of the downlink control channel monitoring capability, where the downlink control channel monitoring capability indicates a capability of monitoring for downlink control channel messages during multiple monitoring occasions per slot.

In some examples of the method, apparatuses, and non-transitory computer-readable medium described herein, the indication of the ULCI monitoring capability and the transmitted indication of the downlink control channel monitoring capability implies a capability of monitoring for ULCIs during multiple monitoring occasions per slot.

Some examples of the method, apparatuses, and non-transitory computer-readable medium described herein may further include operations, features, means, or instructions for monitoring for ULCIs during a set of monitoring occasions per slot, and monitoring for downlink control channel messages during a set of monitoring occasion per slot, where the downlink control channel messages include control signaling that may be different from the ULCIs.

In some examples of the method, apparatuses, and non-transitory computer-readable medium described herein, the downlink control channel monitoring capability includes an indication of a monitoring span gap and an indication of a monitoring span length.

In some examples of the method, apparatuses, and non-transitory computer-readable medium described herein, the downlink control channel monitoring capability includes a physical downlink control channel monitoring capability.

In some examples of the method, apparatuses, and non-transitory computer-readable medium described herein, the indication of the ULCI monitoring capability includes a capability to receive ULCIs and to cancel uplink transmissions according to the ULCIs.

A method of wireless communications at a base station is described. The method may include identifying a downlink control channel monitoring capability for a UE, receiving, from the UE, an indication of an uplink cancellation indication (ULCI) monitoring capability, and configuring one or more monitoring occasions for ULCIs based on the ULCI monitoring capability.

An apparatus for wireless communications at a base station is described. The apparatus may include a processor, memory coupled with the processor, and instructions stored in the memory. The instructions may be executable by the processor to cause the apparatus to identify a downlink control channel monitoring capability for a UE, receive, from the UE, an indication of an uplink cancellation indication (ULCI) monitoring capability, and configure one or more monitoring occasions for ULCIs based on the ULCI monitoring capability.

Another apparatus for wireless communications at a base station is described. The apparatus may include means for identifying a downlink control channel monitoring capability for a UE, receiving, from the UE, an indication of an uplink cancellation indication (ULCI) monitoring capability, and configuring one or more monitoring occasions for ULCIs based on the ULCI monitoring capability.

A non-transitory computer-readable medium storing code for wireless communications at a base station is described. The code may include instructions executable by a processor to identify a downlink control channel monitoring capability for a UE, receive, from the UE, an indication of an uplink cancellation indication (ULCI) monitoring capability, and configure one or more monitoring occasions for ULCIs based on the ULCI monitoring capability.

Some examples of the method, apparatuses, and non-transitory computer-readable medium described herein may further include operations, features, means, or instructions for transmitting a configuration in a radio resource control message which configures ULCI monitoring occasions based on the ULCI monitoring capability.

Some examples of the method, apparatuses, and non-transitory computer-readable medium described herein may further include operations, features, means, or instructions for identifying that the downlink control channel monitoring capability indicates a capability of monitoring for downlink control channel messages during a single monitoring occasion per slot, and receiving an indication of a capability of monitoring for ULCIs during multiple monitoring occasions per slot based on the identifying.

In some examples of the method, apparatuses, and non-transitory computer-readable medium described herein, the indication of a capability of monitoring for ULCIs during multiple monitoring occasions per slot includes an indication of a monitoring span gap and an indication of a monitoring span length.

Some examples of the method, apparatuses, and non-transitory computer-readable medium described herein may further include operations, features, means, or instructions for receiving an indication of the downlink control channel monitoring capability, where the downlink control channel monitoring capability indicates a capability of monitoring for downlink control channel messages during multiple monitoring occasions per slot.

Some examples of the method, apparatuses, and non-transitory computer-readable medium described herein may further include operations, features, means, or instructions for inferring a capability of monitoring for ULCIs during multiple monitoring occasions per slot based on the received indication of the downlink control channel monitoring capability and the indication of the ULCI monitoring capability.

In some examples of the method, apparatuses, and non-transitory computer-readable medium described herein, the downlink control channel monitoring capability includes an indication of a monitoring span gap and an indication of a monitoring span length.

In some examples of the method, apparatuses, and non-transitory computer-readable medium described herein, the downlink control channel monitoring capability includes a physical downlink control channel monitoring capability.

In some examples of the method, apparatuses, and non-transitory computer-readable medium described herein, the indication of the ULCI monitoring capability includes a capability to receive ULCIs and to cancel uplink transmissions according to the ULCIs.

DETAILED DESCRIPTION

Figure 1:
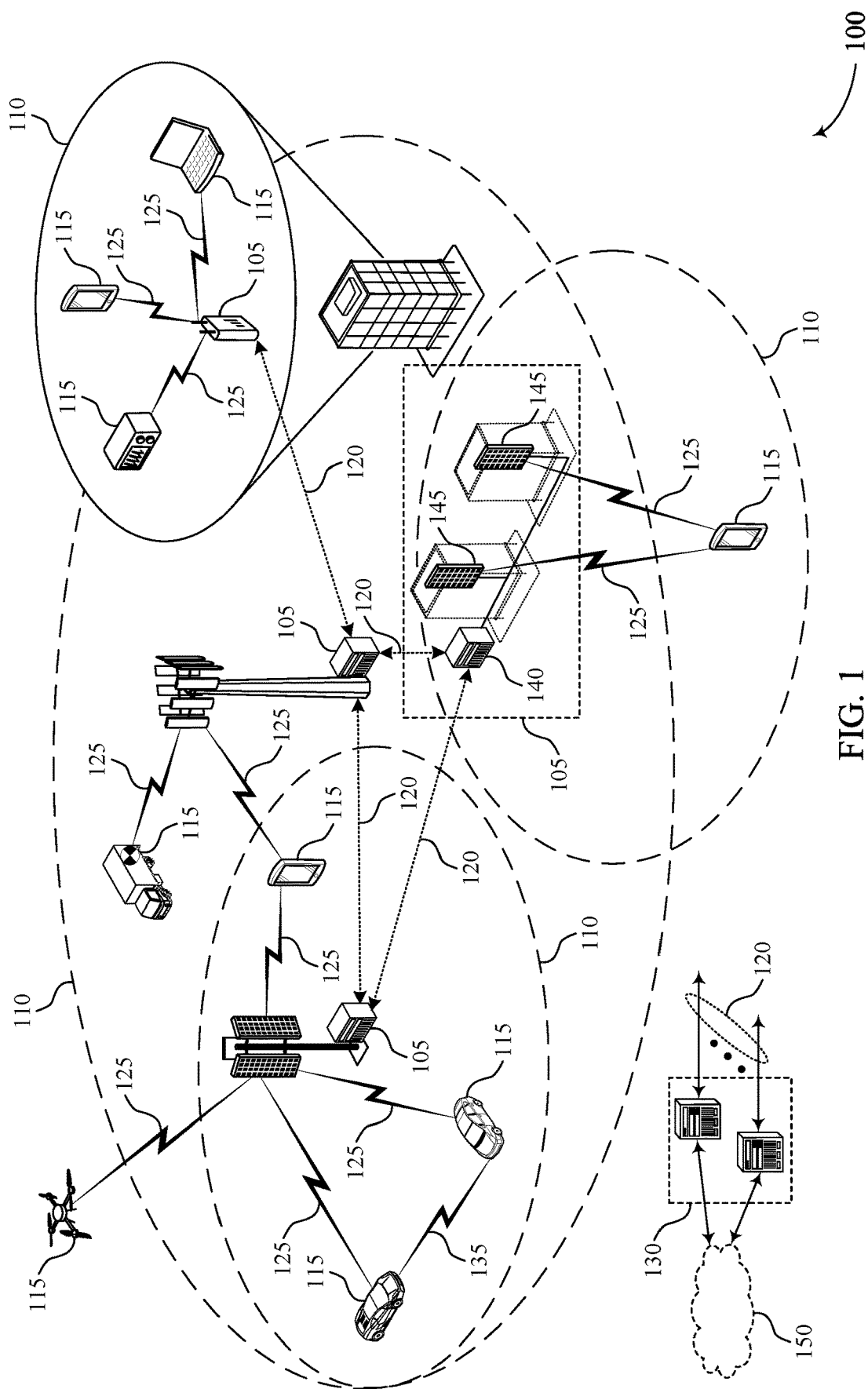
FIG. 1 illustrates an example of a system for wireless communications that supports uplink cancellation indication capability signaling in accordance with aspects of the present disclosure.

In some wireless communication systems, such as NR systems, various communication devices such as base stations and UEs may support data transmissions over configured resources of a channel according to different latency and reliability requirements for the transmitted data. For example, the communication devices may support ultra-reliable low latency (URLLC) communication in order to reduce end-to-end latency and increase reliability for data transmissions in the network. In addition, the communication devices may support eMBB communication, which may support high data rates and wide coverage, but may have increased latency and decreased reliability as compared to URLLC communications. The coexistence of both URLLC and eMBB communications on the same radio resources may pose problems due to a trade-off between various requirements, such as latency, reliability, spectral efficiency, etc. Therefore, different techniques may be used (e.g., inter-UE eMBB/URLLC uplink multiplexing) to efficiently schedule resources in the wireless network.

In some examples, a wireless network may support uplink cancellation indication (ULCI) (e.g., uplink preemption indication), which may allow for improved scheduling for different data transmissions within the network. In some examples, a UE may be scheduled to transmit data on a set of resources, and then may later receive a ULCI, for example, via a physical downlink control channel (PDCCH) which may cancel at least a portion of the scheduled lower priority uplink transmission (e.g., an uplink eMBB transmission) in order to schedule a second uplink transmission from a different UE (e.g., a URLLC configured UE). The second transmission may in some cases be an urgent URLLC uplink transmission, or may otherwise include data with higher priority (e.g., data with lower latency or higher reliability requirements) than the first transmission.

In some aspects, a UE may be configured to frequently monitor a channel or a set of resources for such ULCI messages. For example, a UE may be configured to monitor the channel for ULCI more frequently than it may monitor for other PDCCH candidates (such as downlink control information (DCI), or scheduling DCI including uplink or downlink grants) during a given slot. As a result, the UE may notify a base station of different monitoring occasions in which it may monitor for downlink control information. Further, the UE may identify a number of monitoring occasions in which it may monitor for different types of downlink control information. For example, the UE may identify a capability for monitoring for ULCI in multiple monitoring occasions per slot, and for monitoring for other downlink control information during a single monitoring occasion per slot of the multiple monitoring occasions. In another example, the UE may identify a capability for monitoring both ULCI and other downlink control information in multiple monitoring occasions per slot.

A base station may receive information from the UE which includes the UE capability for monitoring ULCI in monitoring occasions, and the base station may configure a number of monitoring occasions for the UE based on the received UE capability for URLLC monitoring.

Aspects of the disclosure are initially described in the context of wireless communications systems. Aspects of the disclosure are further illustrated by and described with reference to examples of signaling, operations, and resource mapping that may support the described techniques for uplink cancellation indication capability signaling. Aspects of the disclosure are further illustrated by and described with reference to apparatus diagrams, system diagrams, and flowcharts that relate to uplink cancellation indication capability signaling.

FIG. 1 illustrates an example of a wireless communications system 100 that supports uplink cancellation indication capability signaling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a wireless communications network may support ULCI applications, which may allow for improved scheduling for different data transmissions within the network. In an example, a ULCI may override a scheduled low priority transmission in favor of a higher priority transmission. In some aspects, a UE may be configured to monitor a channel or a set of resources more frequently for ULCI than it may monitor for other downlink transmissions of PDCCH candidates (such as DCI, or scheduling DCI including uplink or downlink grants) during a given slot. In some cases, the UE may report to the network a capability for monitoring for ULCI in addition to other downlink transmissions.

In one example, a UE may identify a downlink control channel monitoring capability (e.g., a PDCCH monitoring capability), and a ULCI monitoring capability. In some cases, the UE may identify a capability for monitoring for ULCI in multiple monitoring occasions per slot. The capability may also indicate the UE's ability to monitor for downlink control channel messages during a single monitoring occasion per slot, or during multiple monitoring occasions per slot. The UE may transmit the monitoring capabilities to a base station, and the base station may configure monitoring occasions for the UE according to the UE's identified monitoring capabilities.

Figure 2:
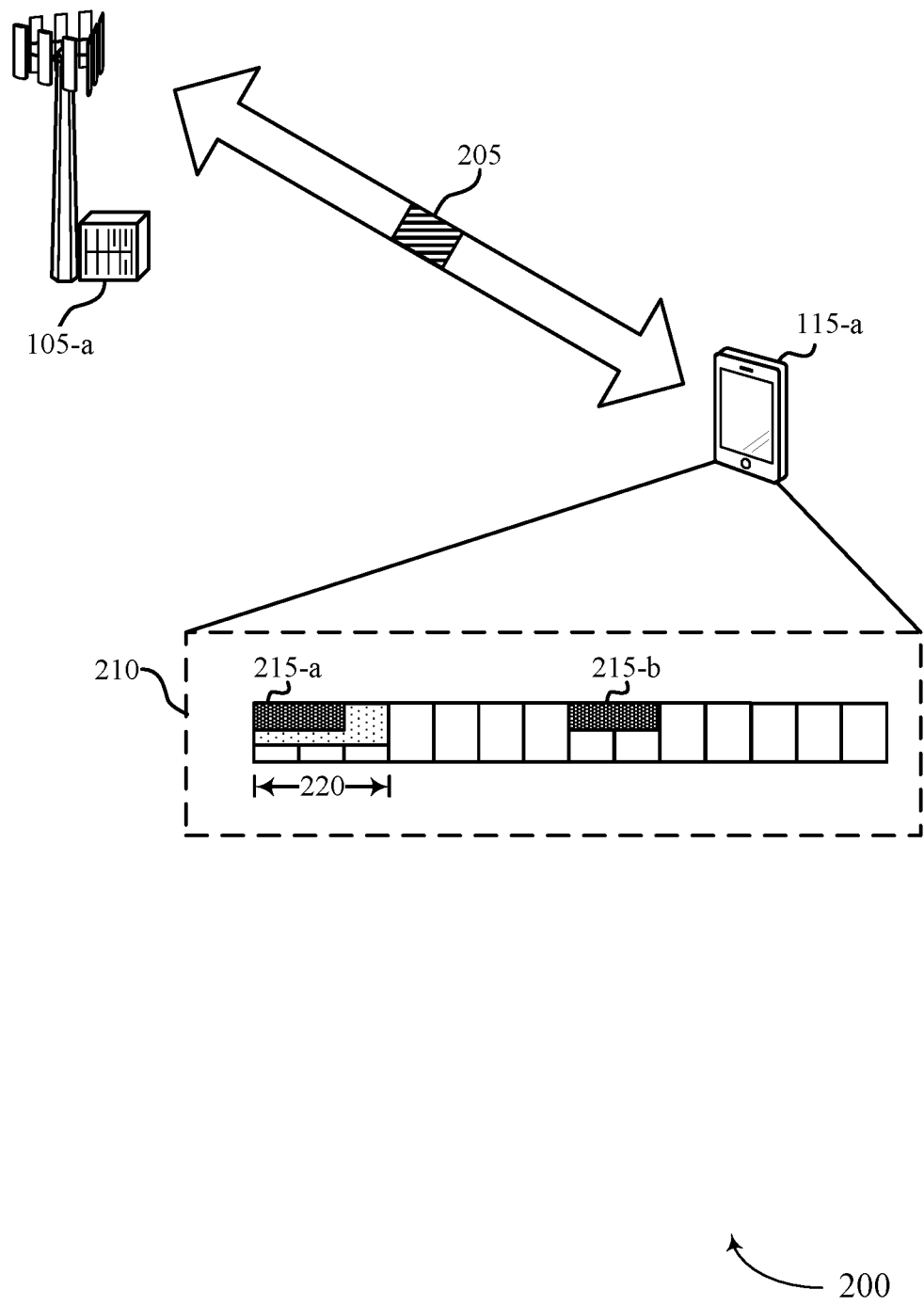
FIG. 2 illustrates an example of a wireless communications network that supports uplink cancellation indication capability signaling in accordance with aspects of the present disclosure.

FIG. 2 illustrates an example of a wireless communications system 200 that supports uplink cancellation indication capability signaling in accordance with aspects of the present disclosure. The wireless communications system 200 may include a base station 105-*a* that supports communication with UE 115-*a*. In some examples, the communications system 200 may support applications that include stringent communication performance, for example, communications between base station 105-*a* and UE 115-*a* may include certain reliability or latency thresholds. Wireless communications system 200 may implement aspects of wireless communications system 100, as described with reference to FIG. 1.

In the wireless communications system 200, UE 115-*a* may support different service deployments, such as URLLC service and eMBB service. For example, the UE 115-*a* may support URLLC transmission to reduce end-to-end latency for data transmission and reception associated with the base station 105-*a*. In some examples, the UE 115-*a* may correspond to a URLLC UE that supports or is otherwise configured for transmissions, such as periodic transmissions, of relatively small data packets. Additionally or alternatively, the UE 115-*a* may support eMBB transmissions associated with high data rates across wide coverage areas. In some examples, compared to URLLC communications, eMBB communications may be associated with less stringent latency and reliability targets or thresholds.

To support the conditions associated with the URLLC and eMBB service deployments, or other types of priority-based resource allocation, the base station 105-*a* and the UE 115-*a* may implement various techniques for dynamic resource allocation and uplink transmission cancellation or preemption. For example, the base station 105-*a* may be configured to transmit a ULCI based on determining a reallocation of uplink resources (e.g., associated with uplink resources allocated to UE 115-*a*), and the UEs 115-*a* may monitor for such ULCIs during a slot. Stated alternatively, UE 115-*a* may be notified about canceled uplink resources via a ULCI it may receive from base station 105-*a*.

The base station 105-*a* may signal a ULCI to UE 115-*a* according to various techniques. For example, UE 115-*a* may be configured to monitor for ULCIs according to various signaling by the base station 105-*a*, such as various types of downlink control signaling, physical channel signaling, RRC signaling, cell-specific signaling, and others. In some examples, ULCIs may be conveyed in DCI over a PDCCH channel, which may support group-common or UE-specific ULCIs. In some aspects, UE 115-*a* may be configured to frequently monitor a channel or a set of resources for ULCI sent by base station 105-*a*. For example, UE 115-*a* may be configured to monitor a channel for ULCI more frequently than it may monitor for other PDCCH candidates (such as DCI, or scheduling DCI, including uplink or downlink grants) during a given slot. In some cases, the UE 115-*a* may report to the base station 105-*a* its capability for cancelling transmissions according to a received ULCI as well as a capability for PDCCH monitoring using signaling 205. Signaling 205 may in some cases include a ULCI monitoring capability for UE 115-*a*.

In some wireless communication systems, such as NR systems, UE 115-*a* may support a number of capabilities for monitoring downlink data channels. For example, UE 115-*a* may be configured to support PDCCH monitoring capabilities. In some cases, monitoring capabilities of the UE 115-*a* may vary based on factors such as UE capability, which may be associated with a number of different feature groups (FGs) 210 which may in some aspects correspond to different UE capabilities.

In a first case, UE 115-*a* may be configured according to a first feature group 210 (e.g., FG 3-1), which may correspond to certain downlink control channel monitoring capabilities of UE 115-*a*. In some wireless communication systems (e.g., NR wireless systems), each UE may be configured to support the first feature group, such that a UE may not need to notify the network of its capability (e.g., a downlink control channel monitoring capability) to support the first feature group. In some cases, the UE 115-*a* may not be configured with capability signaling, and it may be implicit that the first feature group is supported by the UE 115-*a* if the UE 115-*a* declares itself as a certain type or class of UE (e.g., an NR or 5G UE).

In the first case as described herein, UE 115-*a* may monitor for a downlink control channel (e.g., a PDCCH) during a portion 220 of the slot associated with the first feature group 210 (e.g., FG 3-1). UE 115-*a* may, in some cases, monitor for the downlink control channel during a beginning or first portion 220 of the slot (e.g., in a UE-specific or common search space configured for the slot). During the first portion 220 of the slot, the UE 115-*a* may monitor for downlink transmissions such as ULCI along with other DCI types. The first portion 220 of the slot may include multiple symbols, and may include, for example, the first three symbols of the slot or the first two symbols of the slot. In the first case, the UE 115-*a* may only support downlink control channel monitoring (e.g., PDCCH monitoring) during the first portion 220 of the slot.

In some cases, a UE that supports the first feature group (e.g., FG 3-1) may in some aspects be an eMBB configured UE. For example, the UE that supports eMBB services may support FG 3-1 for PDCCH monitoring because the communications for eMBB traffic may occur once per slot (e.g., the UE may monitor for PDCCH during one monitoring occasion per slot). In such cases, however, a UE may still be configured to monitor for ULCI transmissions, and may need to monitor for ULCI more frequently than other type of DCIs (e.g., scheduling (unicast) DCI or group-common DCIs). In such cases, a UE may be configured to support a new feature group which supports more frequent ULCI monitoring.

In a second case, UE 115-*a* may be configured according to a second feature group 210, which may be referred to as FG A. FG A may in some aspects correspond to certain downlink control channel monitoring capabilities of UE 115-*a*. In some wireless communication systems (e.g., NR wireless systems), a UE may notify the network of its capability (e.g., a downlink control channel monitoring capability) to support the second feature group.

UE 115-*a* may indicate to base station 105-*a* that it is capable of monitoring for ULCI during multiple monitoring occasions 215 (e.g., sub-slots 215-*a* and 215-*b*) of the slot. UE 115-*a* may also indicate a capability to monitor for other kinds of DCI only during a single (e.g., beginning) monitoring period configured for the slot, while also monitoring for ULCI transmissions during the same monitoring period. For example, the UE 115-*b* may monitor for both ULCI and other DCI during monitoring period 215-*a*, but may only monitor for ULCI during monitoring period 215-*b*.

In some aspects, the UE capabilities described herein may provide for UE 115-*a* to perform sub-slot-based PDCCH monitoring for ULCI and slot-based PDCCH monitoring for other types of downlink control information (e.g., UE specific and group common DCIs, and other scheduling DCIs). In the case where UE 115-*a* is configured to support the first feature group, the UE 115-*a* may report sub-slot-based ULCI monitoring capabilities along with other kinds of information such as parameters related to monitoring occasions for the UE 115-*a*.

According to the second case, and in some other examples, a slot may be configured with a number of PDCCH monitoring occasions 215. A first occasion 220 may correspond to an initial portion of the slot, and in some cases, may be a first set of symbols (e.g., two or three OFDM symbols) which may include search spaces that the UE 115-*a* monitors for downlink transmissions. During the first set of symbols 220, including the first monitoring occasion 215*a*, the UE 115-*a* may monitor for downlink transmissions including both ULCI and other DCI types. Then, for other monitoring occasions during the slot (e.g., during monitoring occasion 215-*b*), the UE may monitor for ULCI (e.g., the search space and DCI format corresponding to ULCI), and may not monitor for other types of DCI.

In some aspects, UE 115-*a* may notify the network that it is capable of monitoring both ULCI and other DCI during a first monitoring occasion, and ULCI in all other monitoring occasions. The UE 115-*a* may transmit an indication 205 containing a ULCI monitoring capability to the base station 105-*a*. The base station 105-*a* may then configure one or more monitoring occasions for ULCI based on the indication 205 sent by the UE 115-*a*.

In a third case, UE 115-*a* may be configured according to a third feature group 210, which may be referred to as FG 3-5b. FG 3-5b may in some aspects correspond to certain additional or enhanced downlink control channel monitoring capabilities of UE 115-*a*. In some wireless communication systems (e.g., NR wireless systems), a UE may notify the network of its capability (e.g., a downlink control channel monitoring capability) to support the third feature group.

In cases where UE 115-*a* is configured to support the third feature group, UE 115-*a* may indicate to base station 105-*a* that it is capable of monitoring for ULCI during multiple monitoring occasions 215 (e.g., sub-slots 215-*a* and 215-*b*) of the slot. UE 115-*a* may also indicate that it is capable of monitoring for other kinds of DCI during a the same multiple monitoring occasions that it monitors for ULCI. For example, a UE that is configured to support the third feature group (e.g., FG 5-5b) may monitor for both ULCI and other types of DCI during the first monitoring period configured for the slot (e.g., during periods 220 and 215-*a*) while also monitoring for ULCI and other types of DCI during additional monitoring occasions configured for the slot (e.g., monitoring occasion 215-*b*).

In the third case where UE 115-*a* may be configured according to the third feature group 210 (e.g., FG 3-5b) the UE 115-*a* may indicate additional and/or enhanced downlink control channel monitoring capabilities, or capabilities different than those associated with the first and second feature groups (e.g., FG 3-1 and FG A). In such cases, UE 115-*a* may be configured to notify the network of a capability (e.g., a downlink control channel monitoring capability) to monitor a downlink control channel during a number of different time periods or monitoring occasions 215 during a slot. The UE 115-*a* may notify the network by transmitting a signal 205 to base station 105-*a*, which may include a ULCI monitoring capability.

According to the third case, and in some other examples, a slot may be configured with a number of PDCCH monitoring occasions 215 as described herein. A first monitoring occasion 215-*a* may correspond to a portion of the slot, which in some cases may include a first set of symbols 220 (e.g., two or three OFDM symbols) which may include a search space that UE 115-*a* may use to monitor for downlink transmissions. The UE 115-*a* may monitor for downlink transmissions including ULCI and other DCI types during monitoring occasion 215-*a*. For other monitoring occasions during the slot (e.g., monitoring occasion 215-*b*), the UE 115-*a* may similarly monitor for ULCI (e.g., the search space and DCI format corresponding to ULCI), and may also monitor for other types of DCI. In some aspects, the UE 115-*a* may notify the network (via a ULCI monitoring capability indication sent with transmission 205), that it is capable of monitoring both ULCI and other DCI during each monitoring occasion 215 of the slot. The base station 105-*a* may configure one or more monitoring occasions for ULCI based on the indication 205 sent by the UE 115-*a*.

In some aspects, a UE which may support the third feature group (e.g., FG 3-5b) may be a URLLC UE. For example, FG 3-5b may be implemented for UEs that can support URLLC services (e.g., UEs that may support both eMBB and URLLC, or UEs that only support URLLC services). Such UEs may monitor PDCCHs (e.g., for scheduling DCIs) multiple times per slot in order to achieve low latency and/or high reliability communications. For such UEs, supporting sub-slot-based ULCI is implicit (e.g., no additional PDCCH monitoring capability is configured for ULCI).

In some examples where the UE 115-*a* supports monitoring for both scheduling DCI and ULCI in multiple monitoring occasions in a slot (e.g., in cases where the UE supports the third feature group), then the UE 115-*a* may not indicate support for the first and second feature groups. Stated alternatively, if UE 115-*a* is configured with a higher capability for reporting ULCI monitoring capability, it may not report that it may support a lower capability.

Figure 3A:
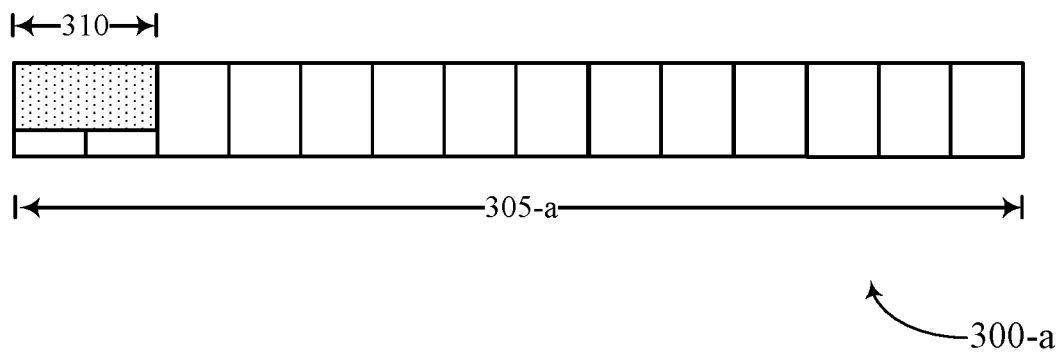
FIGS. 3A through 3C illustrate examples of feature group configurations that support uplink cancellation indication capability signaling in accordance with aspects of the present disclosure.
Figure 3B:
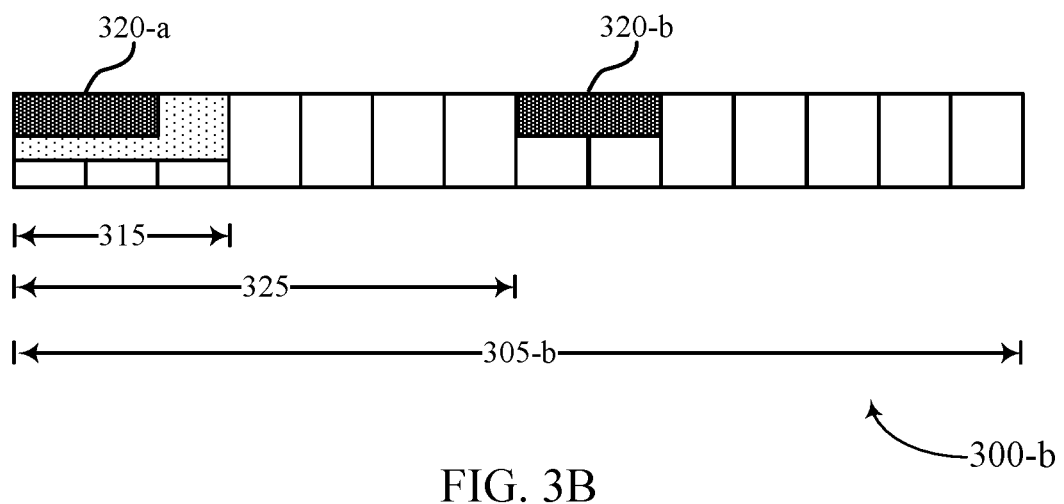
Figure 3C:
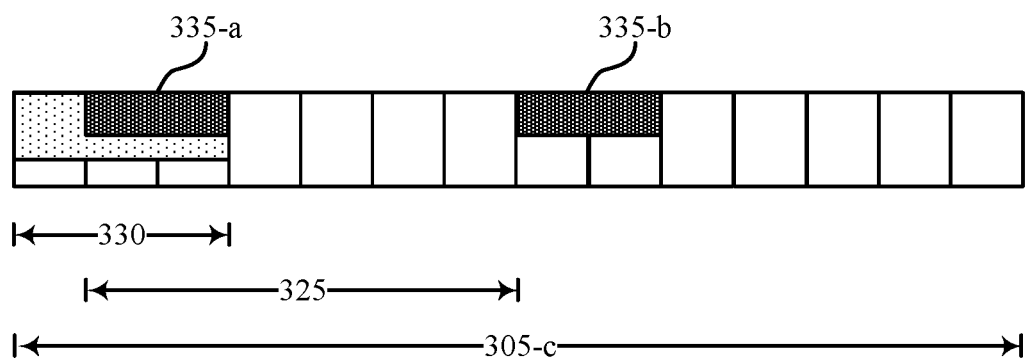

FIGS. 3A-3C illustrate examples of various feature group configurations for downlink control channel monitoring in a wireless communications system that supports uplink cancellation indication capability signaling in accordance with aspects of the present disclosure. Each feature group may be associated with certain downlink control channel monitoring capabilities at a UE. Each feature group may correspond to a slot 305 containing a number (e.g., 14) OFDM symbols spanning a given time period.

FIG. 3A shows feature group 300-*a* corresponding to a slot 305-*a*. In some cases, the first feature group may be feature group 3-1. For operations utilizing the first feature group, a UE may monitor for a downlink control channel (e.g., a PDCCH) for downlink transmissions during a first portion 310 of the slot. In some cases, the UE may perform blind decoding of a search space included at the beginning of slot 305-*a*. For example, the first portion 310 of the slot may include a common search space (CSS) (e.g., a type 3 CSS) or a UE-specific search space (UESS), which the UE may use to search for various messages or for PDCCH data (e.g., control information such as DCI) transmitted to the UE. A UE specific search space may be dedicated per-UE, and may be indicated to a UE using control signaling, such as RRC signaling. A common search space may be used for applying signaling messages for a number of UEs before a link establishment for each UE. A search space may be configured for a certain duration within the slot, for example, each search space may be configured to be a region associated with the first 3 symbols of the slot (e.g., first portion 310), and the UE may use the duration of the first 3 symbols to search for control channel messages. In addition, the first portion 310 of the slot may include a set of symbols (e.g., up to three symbols) allocated for a CORESET or other physical resources that the UE may monitor.

A UE may indicate to a base station or a network node that it may support feature group 300-*a* (e.g., feature group 3-1). The UE may indicate to a base station or wireless node that it may be capable of monitoring for ULCI during a single monitoring occasion in a slot. For example, the UE may report that it is capable of monitoring for ULCI in addition to other types of DCI during a beginning portion 310 of the slot 305-*a*.

In some cases, the UE may report ULCI capability (e.g., the UE reports that it is able to support ULCI and that it is able to cancel various uplink transmissions according to ULCI), and may not report the capability of sub-slot ULCI monitoring. In such cases, the base station may assume (e.g., the base station implicitly infers) that the UE is able to monitor ULCI during the beginning portion 310 of the slot 305-*a*, at the same time as it may monitor for other types of DCI. In such cases, the UE may not explicitly inform the network of its capabilities, but rather, the UE may declare itself as a certain type or class of UE, and the network may assume based on this declaration that the UE has a downlink control channel monitoring capability corresponding to feature group 300-*a*.

FIG. 3B shows an example of a feature group 300-*b* corresponding to a slot 305-*b*. In a first application, the feature group 300-*b* may be an example of FG A. In a second application, the feature group 300-*b* may be an example of FG 3-5b. For operations utilizing the second feature group, the UE may be configured to notify the network of a capability (e.g., a downlink control channel monitoring capability), of the UE to monitor a downlink control channel during a number of different time periods or monitoring occasions during a slot (e.g., monitoring occasions 320) in addition to a first monitoring period 315.

According to the first application of feature group 300-*b*, a UE may be configured to support FG A. The UE may monitor for a downlink control channel (e.g., PDCCH) during a portion 315 of slot 305-*b*. The UE may indicate, for example, to a base station or wireless node, that it may be capable of monitoring for ULCI during multiple monitoring occasions 320 (e.g., sub-slots) of the slot. The UE may also indicate a capability to monitor for other types of DCI during a single monitoring occasion 320 (e.g., monitoring occasion 320-*a*). In the example of FG A, the UE may perform sub-slot-based PDCCH monitoring for ULCI.

The UE may indicate to a base station or wireless node that it may be capable of monitoring for ULCI during multiple sub-slots of the slot 300-*b*. The UE may also indicate a capability to monitor for other kinds of DCI during a single monitoring period 310 configured for the slot while it also monitors for ULCI during the same monitoring period 310 (e.g., the UE may be capable of monitoring for ULCI and other kinds of DCI during the same initial monitoring period 310). In some cases, the monitoring capability indication for the other kinds of DCI may not be in the form of explicit capability signaling. For example, the network may implicitly assume that the UE is capable of monitoring for other types of DCI during a single monitoring occasion. However, the capability for a UE to perform sub-slot monitoring (e.g., sub-slot-based PDCCH monitoring for ULCI) may be indicated as an enhanced capability for the UE. In some aspects, the capability for the UE to monitor for ULCI during multiple monitoring occasions in a slot may be a new capability associated with a new feature group (e.g., FG A and FG 3-5b). This capability may provide for the UE to perform sub-slot-based PDCCH monitoring for ULCI, and slot-based PDCCH monitoring for other types of downlink control information, for example, UE specific and group common DCIs, and other scheduling DCIs.

In addition, the support of the sub-slot-based ULCI monitoring may be an optional capability that may be indicated by the UE (e.g., sub-slot-based ULCI may be indicated as a higher capability for the UE). Thus, the capability for sub-slot-based ULCI monitoring may be different than a default capability of UEs supporting ULCI. For example, if a UE reports a capability to support ULCI, but does not report a higher capability to support sub-slot-based ULCI monitoring, the UE can only monitor ULCI during one monitoring occasion per slot (e.g., according to FG 3-1).

In cases where the UE is configured to support the second feature group (e.g., FG A), the UE may report sub-slot-based ULCI monitoring capabilities along with other kinds of information such as parameters related to certain monitoring periods configured for the UE. For example, the UE may report span information, such as (X, Y) pairs supported by the UE, which may include span gap (X) and span length (Y). (X, Y) pairs that may be reported by the UE may be configured based on a feature group in which it is applied, for example, an (X, Y) pair may be configured in accordance with any restrictions or limitations of a given feature group. For example, the restrictions or limitations of FG 3-5b may apply to the combined monitoring budget of FG 3-1 and FG A for a reported (X,Y) pair. In some aspects, such restrictions or limitations may include properties of the span, such as definition of span, number of starting indices of downlink control channel monitoring occasions, span gap length, span duration, etc. In some examples, the restrictions on number of starting indexes of PDCCH monitoring occasions, which may include ULCI and all other types of DCI, should not exceed floor(14/X).

According to the second application of feature group 300-*b*, a UE may be configured to support FG 3-5. The UE may monitor for a downlink control channel (e.g., PDCCH) during a portion 315 of slot 305-*b*. The UE may indicate, for example, to a base station or wireless node, that it may be capable of monitoring for ULCI during multiple monitoring occasions 320 (e.g., sub-slots) of the slot. The UE may also indicate a capability to monitor for other types of DCI during multiple monitoring occasions 320 (e.g., during both monitoring occasions 320-*a* and 320-*b*). In the example of FG 3-5, the UE may perform sub-slot-based PDCCH monitoring, for example, for ULCI, UE specific and group common DCIs, and other scheduling DCIs.

The UE may indicate to a base station or wireless node that it may be capable of monitoring for ULCI during multiple sub-slots of the slot 300-*b*. The UE may also indicate a capability to monitor for other kinds of DCI during the multiple sub-slots of the slot 300-*b* while it also monitors for ULCI during the same sub-slots (e.g., the UE may be capable of monitoring for ULCI and other kinds of DCI during the same monitoring periods 320-*a* and 320-*b*). In some cases, the monitoring capability indication for the ULCI and other kinds of DCI may not be in the form of explicit capability signaling.

In the case where the UE is configured to support the feature group 300-*b*, and in some other cases, the reporting of sub-slot-based ULCI may include the UE reporting span information such as supported (X, Y) pairs. The UE may identify supported span length and span gap, along with other information for the slot. The reported (X, Y) pair may be configured based on the feature group it may be associated with, which may include any restrictions or limitations posed by a given feature group. For example, the restrictions or limitations posed by feature group 3-5b may apply to the combined monitoring budget of ULCI and other PDCCH candidates. In some aspects, the ULCI and other PDCCH candidates may follow the span definition, span limit, span gap, span duration, and the PDCCH monitoring occasion starting index limit, etc. In some cases, ULCI may be configured in any span (e.g., subject to any limitations of span or monitoring occasion starting index).

In one example, a UE may indicate a capability for monitoring a number of different downlink transmissions in a downlink control channel during a number of monitoring occasions 320 configured for a slot. In some cases, more than one monitoring occasion may be configured within slot 305-*b*, with each monitoring occasion 320 separated by a given duration corresponding to a number of symbols. According to some aspects, the duration between a starting symbol of two monitoring occasions may be referred to as a span gap. For example, the two monitoring occasions 320 may be separated by a span gap 325 that spans X symbols (e.g., X symbols may be the duration between a starting symbol of each MO), such that X may be a minimum time separation between two spans. In addition, each span may have a maximum length, which in some cases may be denoted by Y, such that each span is Y symbols in length. The UE may indicate that it may support operations in feature group 300-b (e.g., FG A, FG 3-5b) by reporting associated span values (X,Y) along with other aspects of UE capability signaling. The example of FIG. 3B shows a valid configuration for a reported (X, Y) value of (7, 3).

In some examples, the monitoring occasions in which a UE monitors for downlink control information during a slot may be configured according to various parameters, including parameters associated with spans between monitoring occasions. Certain parameters may be different based on a UE capability, may be different based on feature group. For example, downlink control channel (e.g., PDCCH) monitoring occasions for a given feature group 300-b and additional PDCCH monitoring occasions may include a number of OFDM symbols of a slot. In one case, there may be more than one monitoring occasion for any two PDCCH monitoring occasions belonging to different spans (and at least one of them is not the monitoring occasions of feature group 300-b). In examples including either the same or different search spaces, there may be a minimum time separation of X OFDM symbols (including cases with a cross-slot boundary) between the start of two spans, and each span may be of length up to Y consecutive OFDM symbols of a slot.

Each span within the slot may have a number of properties or specifications. For example, spans located in the slot do not overlap, and every span is contained in a single slot. In addition, the number of spans in a slot may be configured to follow a span pattern, where the same span pattern repeats in every slot. The separation between consecutive spans within and across slots may be unequal but the same (X, Y) limit must be satisfied by all spans. In addition, each monitoring occasion may be fully contained in one span.

In some cases, a span or a set of spans may be configured according to a span pattern. In order to determine a suitable span pattern, a first a bitmap b(1), 0<=1<=13 may generated, where b(1)=1 if symbol 1 of any slot is part of a monitoring occasion, otherwise, b(1)=0. The first span in the span pattern may begin at the smallest 1 for which b(1)=1. The next span in the span pattern may begin at the smallest 1 not included in the previous span(s) for which b(1)=1. The span duration may be max {maximum value of all CORESET durations, minimum value of Y in the UE reported candidate value}. In some cases, the last span in a slot may be of shorter duration. A downlink control channel (e.g., PDCCH) monitoring configuration may satisfy the UE capability limitation in some cases where the span arrangement satisfies a gap separation for at least one (X, Y) in the UE reported candidate value set for each slot, including across slot boundaries.

In some cases, scheduling DCI may be received by the UE. Various restrictions on scheduling DCI may be included for a set of monitoring occasions which are within the same span. In some cases, for FDD, a UE may process one unicast DCI scheduling downlink and one unicast DCI scheduling uplink per scheduled component carrier across a set of monitoring occasions. In some cases, for TDD, a UE may process one unicast DCI scheduling downlink and two unicast DCI scheduling uplink per scheduled component carrier across this set of monitoring occasions. In addition, the UE may process two unicast DCI scheduling downlink and one unicast DCI scheduling uplink per scheduled component carrier across this set of monitoring occasions for TDD.

In some cases, the number of monitoring occasions may depend on a number of different factors. For example, there may be various restrictions on starting indices of PDCCH monitoring occasions. The number of different start symbol indices of spans for all PDCCH monitoring occasions per slot, (including PDCCH monitoring occasions of feature groups such as FG 3-1), may be no more than floor (14/X), where X is the minimum value reported by UE). The number of different start symbol indices of PDCCH monitoring occasions per slot (including PDCCH monitoring occasions of FG 3-1) may be up to 7 different start symbol indices. The number of different start symbol indices of PDCCH monitoring occasions (per half-slot including PDCCH monitoring occasions of FG 3-1) may be up to 4 different start symbol indices (e.g., for a secondary cell (SCell)).

A UE may determine the parameters (X,Y) including X symbols between starting symbols of each span, and Y symbols in total span length. A UE may signal (X, Y) as follows:

(X, Y):
set1=(7, 3);
set2=(4, 3) and (7, 3);
set3=(2, 2) and (4, 3) and (7, 3).

FIG. 3C shows feature group 300-c corresponding to a slot 305-c. In some cases, feature group 300-c may be an example of a feature group 3-5B. For operations utilizing the second feature group, the UE may be configured to notify the network of a capability (e.g., a downlink control channel monitoring capability), of the UE to monitor a downlink control channel during a number of different time periods or monitoring occasions 335 during a slot (e.g., monitoring occasions 320) in addition to a first monitoring period 315.

In the example of FIG. 3C, a UE may indicate a capability for monitoring a number of different downlink transmissions in a downlink control channel during a number of monitoring occasions 335 configured for slot 300-c. In some cases, more than one monitoring occasion 335 may be configured within slot 305-b, with each monitoring occasion 335 may be separated by a given duration corresponding to a number of symbols, which in some cases may be a minimum number of symbols.

In some examples, the span may be defined as a union of monitoring occasions (e.g., search spaces). For example, according to this span definition, monitoring occasion 330 and 335-a may belong to the same span, where monitoring occasion 335-b (e.g., starting from symbol 7) may belong to a second span.

In the example of feature group 300-c, monitoring occasion 335-a and monitoring occasion 335-b may be separated by a span gap 325 that spans X symbols (e.g., X symbols may be the duration between a starting symbol of each monitoring occasion), such that X may be a minimum separation between the first symbol of the first span and the first symbol of the second span. Feature group 300-c shows a span of 7 (e.g., the number of symbols between the first symbol of the first span and the first symbol of the second span is 7 symbols). In addition, each span may have a maximum length, which in some cases may be denoted by Y, such that each span is Y symbols in length. Feature group 300-c shows a length of each span which is upper bounded by 3 symbols.

The UE may indicate that it may support operations in a certain feature group (e.g., FG 3-5b) by reporting allowed span values (X,Y) along with other aspects of UE capability signaling. The example of FIG. 3C, however, shows an example of an invalid configuration because the number of starting symbols of all monitoring occasions are 3, which is greater than 14/X (e.g., 14/7=2).

Figure 4:
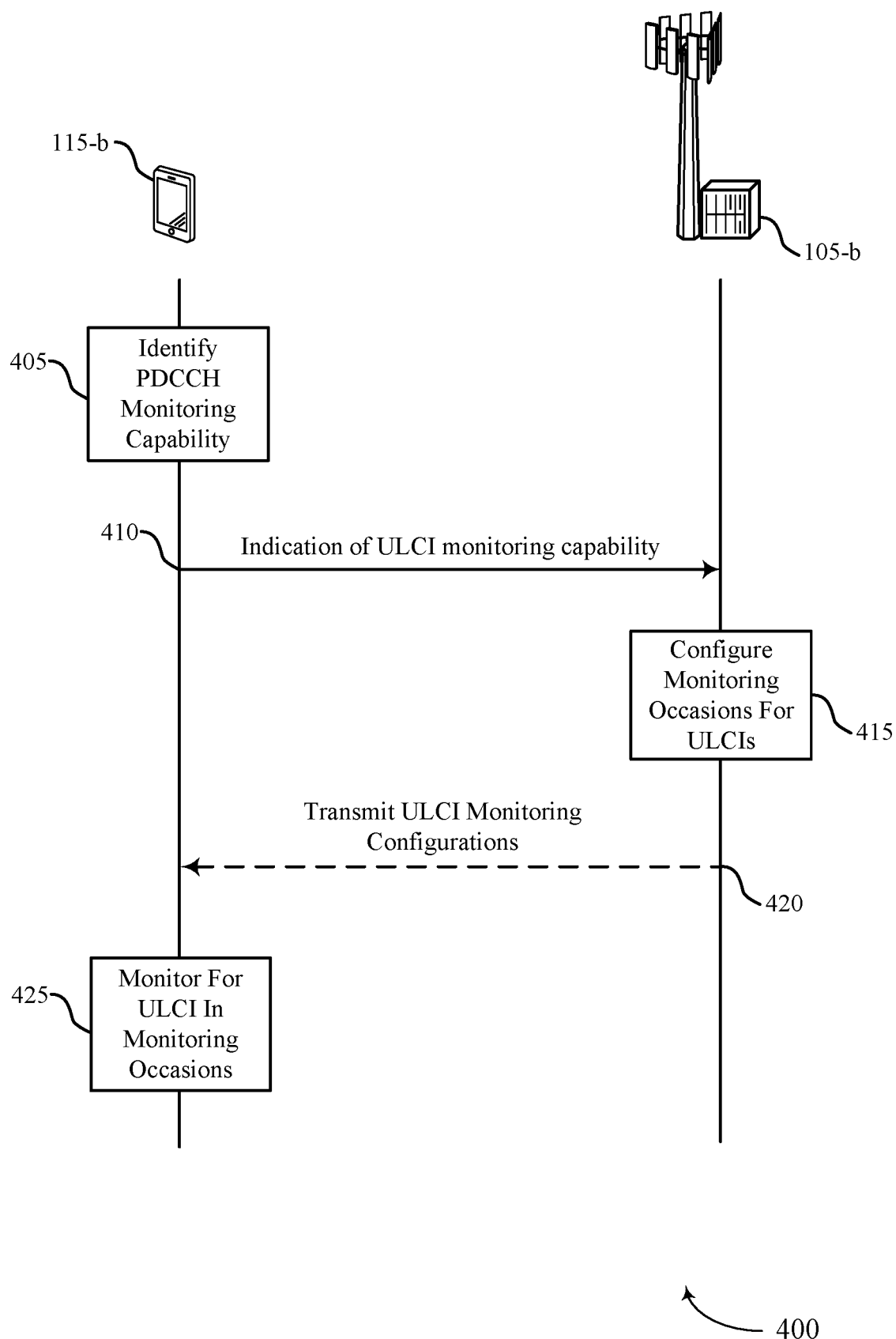
FIG. 4 illustrates an example of a process flow that supports uplink cancellation indication capability signaling in accordance with aspects of the present disclosure.

FIG. 4 illustrates an example of a process flow 400 that supports uplink cancellation indication capability signaling in accordance with aspects of the present disclosure. The operations of process flow 400 may be implemented by a UE 115-*b* and a base station 105-*b*, or any of their components as described herein. For example, the operations of method 400 may be performed by a communication manager or other device components as described with reference to FIGS. 5 through 12. In some examples, UE 115-*b* may execute a set of instructions to control the functional elements of the UE to perform the described functions. Additionally or alternatively, UE 115-*b* may perform aspects of the described functions using special-purpose hardware.

At 405, the UE may identify a downlink control channel monitoring capability, for example, a PDCCH monitoring capability. In some cases, the UE 115-*b* may identify that the downlink control channel monitoring capability indicates a capability of monitoring for downlink control channel messages during a single monitoring occasion per slot (e.g., corresponding to FG 3-1). In some other cases, the UE 115-*b* may identify that the downlink control channel monitoring capability indicates a capability of monitoring for downlink control channel messages during multiple monitoring occasions per slot (e.g., FG 3-5B). The operations of 405 may be performed according to the methods described herein. In some examples, aspects of the operations of 405 may be performed by a PDCCH monitoring capability component as described with reference to FIGS. 6 through 11.

At 410, the UE 115-*b* may transmit, and the base station 105-*b* may receive, an indication of a ULCI monitoring capability. In some cases, the indication of a ULCI monitoring capability may include an indication of a monitoring span gap and an indication of a monitoring span length. In some cases, the indication of a ULCI monitoring capability includes an indication that the UE supports ULCI. In some cases, the indication of a ULCI monitoring capability includes an explicit indication that the UE supports monitoring for ULCI during multiple monitoring occasions per slot (e.g., in the case of FG 3-1). In some cases, the indication of a ULCI monitoring capability is an implied indication based on the UE transmitting a certain downlink control channel monitoring capability (e.g., an enhanced PDCCH monitoring capability corresponding to monitoring for PDCCH candidates during multiple monitoring occasions per slot). In such cases, the ULCI monitoring capability may imply a capability of monitoring ULCIs during multiple monitoring occasions per slot. The operations of 405 may be performed according to the methods described herein. In some examples, aspects of the operations of 410 may be performed by a ULCI monitoring capability component as described with reference to FIGS. 6 through 11.

At 415, the base station 105-*b* may configure one or more monitoring occasions for ULCIs based at least in part on the received ULCI monitoring capability for the UE 115-*b*. The number of monitoring occasions may include monitoring for downlink control channel messages during a single monitoring occasion per slot, or during multiple monitoring occasions per slot based on the ULCI monitoring capability. The operations of 415 may be performed according to the methods described herein. In some examples, aspects of the operations of 415 may be performed by a ULCI configuration component as described with reference to FIG. 11.

At 420, the base station 105-*b* may transmit, and the UE 115-*b* may receive, ULCI monitoring configurations in an RRC message for ULCI based at least in part on the ULCI monitoring capability. In some cases, the ULCI monitoring configurations may include ULCI monitoring occasions and other aspects of ULCI configurations. The operations of 420 may be performed according to the methods described herein. In some examples, aspects of the operations of 415 may be performed by an RRC component as described with reference to FIGS. 7 through 11.

At 425, the UE 115-*b* may monitor for ULCIs in monitoring occasions based at least in part on the ULCI monitoring capability. For example, the UE 115-*b* may monitor for ULCIs during a plurality of monitoring occasions per slot and may monitor for downlink control channel messages during a single monitoring occasion per slot, wherein the downlink control channel messages comprise control signaling that is different from the ULCIs (e.g., scheduling DCI). In some cases, the UE 115-*b* may monitor for ULCIs during a plurality of monitoring occasions per slot and may monitor for downlink control channel messages during a plurality of monitoring occasions per slot, wherein the downlink control channel messages comprise control signaling that is different from the ULCIs (e.g., scheduling DCI). The operations of 425 may be performed according to the methods described herein. In some examples, aspects of the operations of 415 may be performed by a ULCI monitoring component as described with reference to FIGS. 6 and 7.

Figure 5:
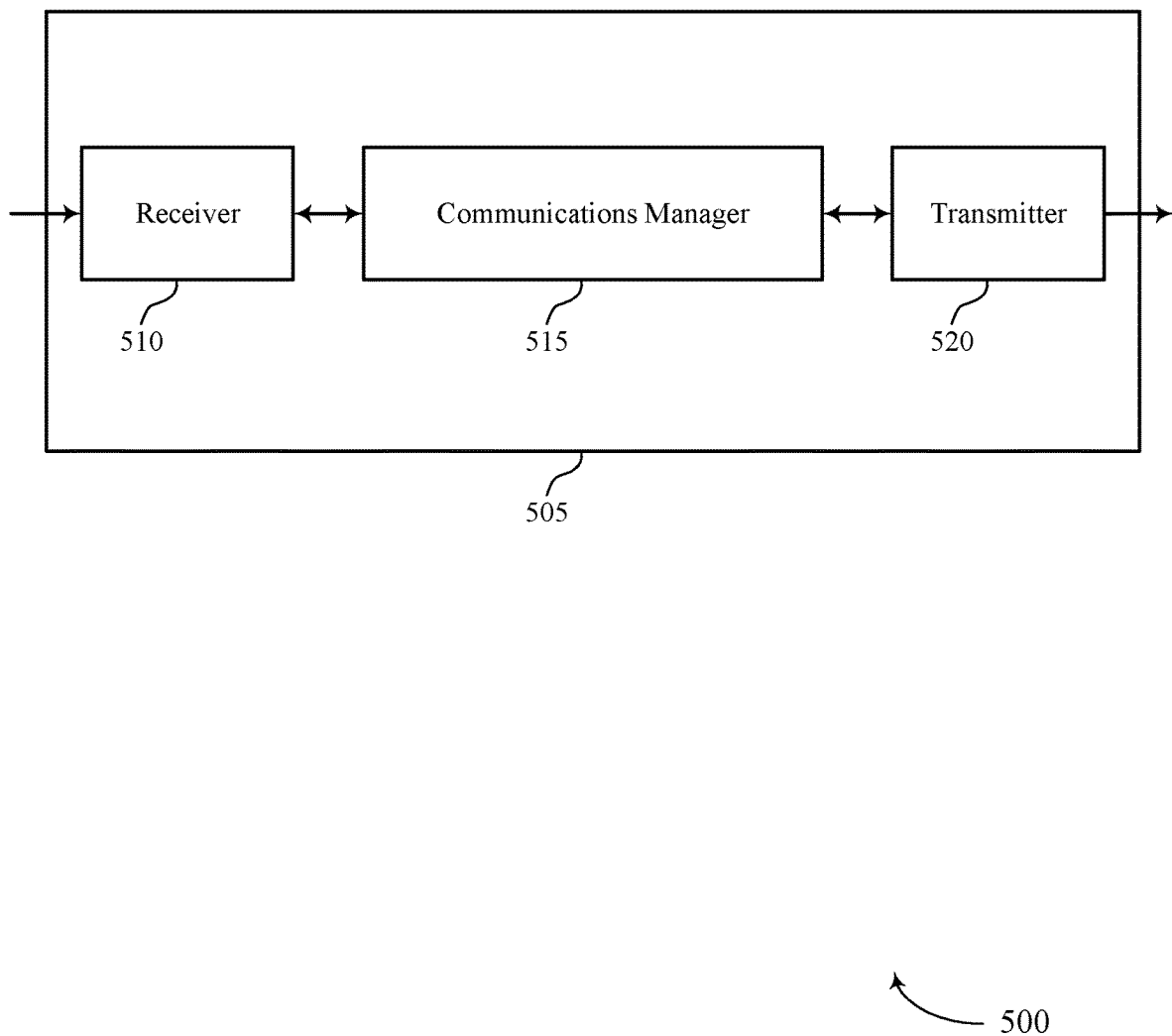
FIGS. 5 and 6 show block diagrams of devices that support uplink cancellation indication capability signaling in accordance with aspects of the present disclosure.

FIG. 5 shows a block diagram 500 of a device 505 that supports uplink cancellation indication capability signaling in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to uplink cancellation indication capability signaling, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a downlink control channel monitoring capability for the UE, transmit, to a base station, an indication of an uplink cancellation indication (ULCI) monitoring capability, and monitor for ULCIs in monitoring occasions based on the ULCI monitoring capability. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, communications manager 515 may be implemented as an integrated circuit or chipset for a mobile device modem, and the receiver 510 and transmitter 520 may be implemented as analog components (e.g., amplifiers, filters, antennas, etc.) coupled with the mobile device modem to enable wireless transmission and reception.

The communications manager 515 as described herein may be implemented to realize one or more potential advantages. Various implementations may enable more efficient scheduling of resources for different data transmissions in the wireless network. For example, communications manager 515 may utilize a ULCI indication to effectively schedule or reschedule uplink transmissions. At least one implementation may enable the communications manager 515 to effectively monitor for transmissions of high priority. At least one implementation may enable communications manager 515 to reduce the latency and increase reliability of certain communication types in the wireless network by implementing ULCI monitoring techniques.

Based on implementing ULCI monitoring indication as described herein, one or more processors of the device 505 (e.g., processor(s) controlling or incorporated with one or more of receiver 510, communications manager 515, and transmitter 520) may process information (e.g., ULCI or other types of DCI) according to an increased frequency based on the ULCI monitoring indication.

Figure 6:
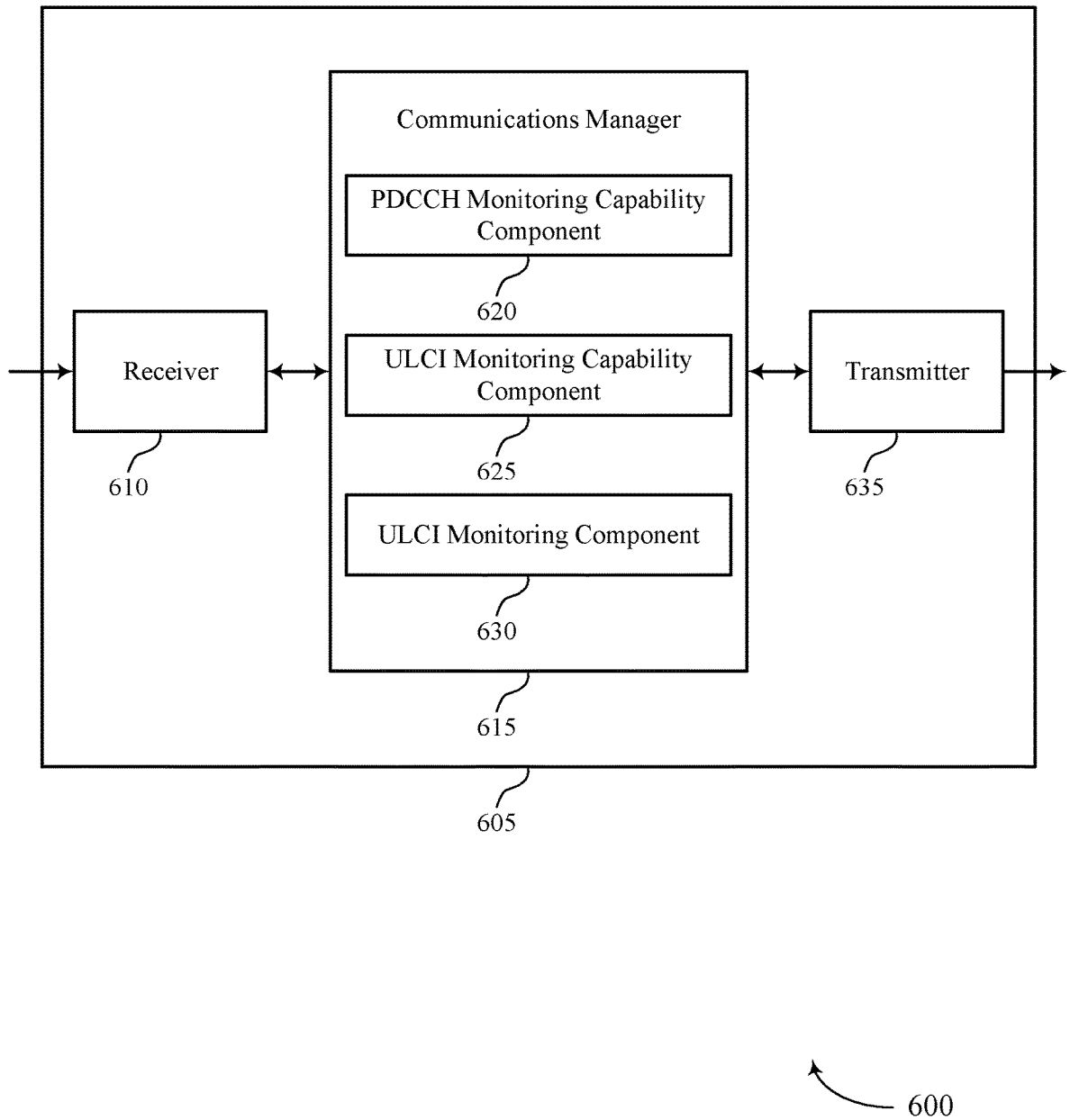

FIG. 6 shows a block diagram 600 of a device 605 that supports uplink cancellation indication capability signaling in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to uplink cancellation indication capability signaling, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a PDCCH monitoring capability component 620, an ULCI monitoring capability component 625, and an ULCI monitoring component 630. The communications manager 615 may be an example of aspects of the communications manager 810 described herein.

The PDCCH monitoring capability component 620 may identify a downlink control channel monitoring capability for the UE.

The ULCI monitoring capability component 625 may transmit, to a base station, an indication of an uplink cancellation indication (ULCI) monitoring capability.

The ULCI monitoring component 630 may monitor for ULCIs in monitoring occasions based on the ULCI monitoring capability.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
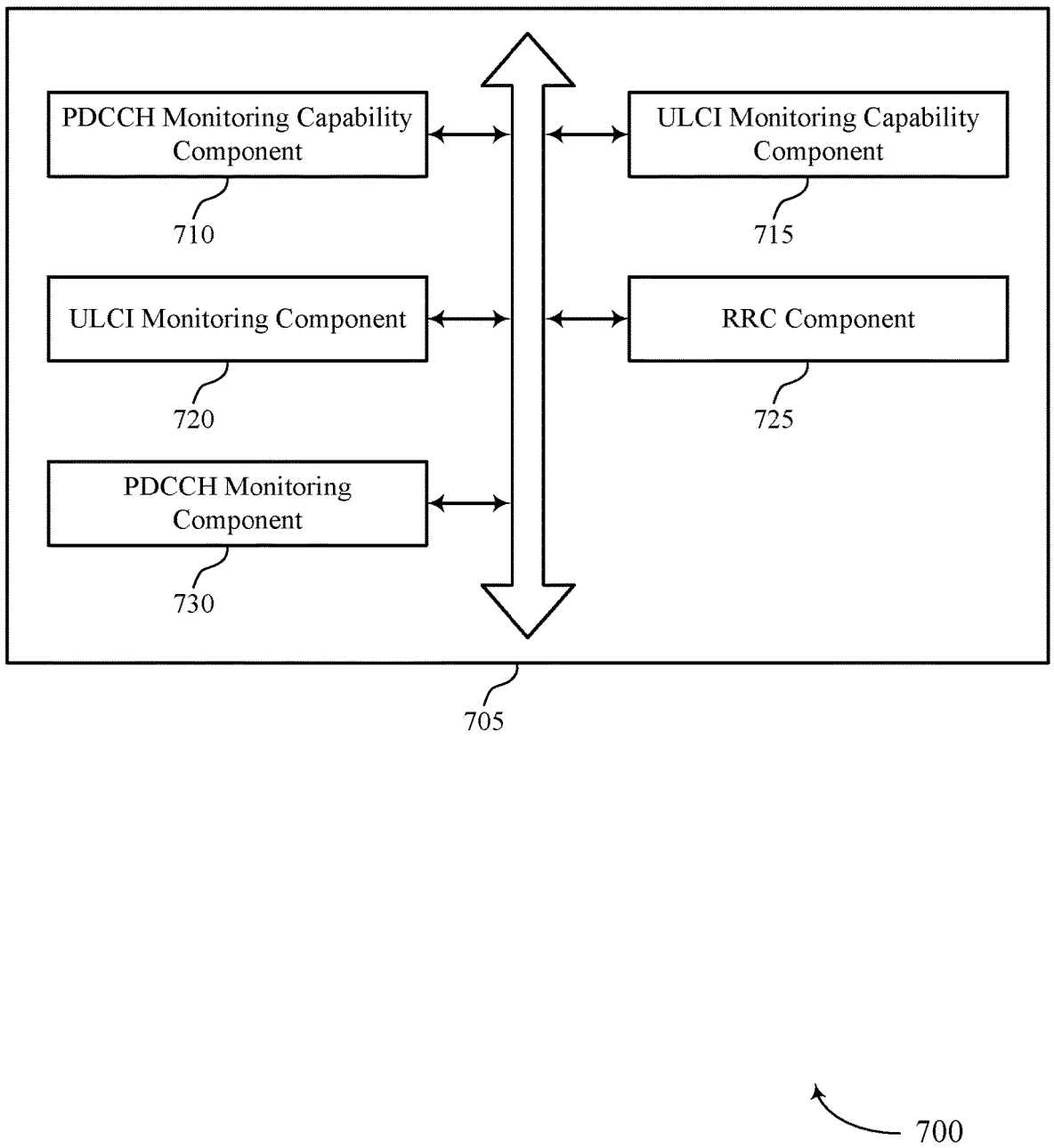
FIG. 7 shows a block diagram of a communications manager that supports uplink cancellation indication capability signaling in accordance with aspects of the present disclosure.

FIG. 7 shows a block diagram 700 of a communications manager 705 that supports uplink cancellation indication capability signaling in accordance with aspects of the present disclosure. The communications manager 705 may be an example of aspects of a communications manager 515, a communications manager 615, or a communications manager 810 described herein. The communications manager 705 may include a PDCCH monitoring capability component 710, an ULCI monitoring capability component 715, an ULCI monitoring component 720, a RRC component 725, and a PDCCH monitoring component 730. Each of these modules may communicate, directly or indirectly, with one another (e.g., via one or more buses).

The PDCCH monitoring capability component 710 may identify a downlink control channel monitoring capability for the UE.

In some examples, the PDCCH monitoring capability component 710 may identify that the downlink control channel monitoring capability indicates a capability of monitoring for downlink control channel messages during a single monitoring occasion per slot.

In some examples, the PDCCH monitoring capability component 710 may transmit an indication of the downlink control channel monitoring capability, where the downlink control channel monitoring capability indicates a capability of monitoring for downlink control channel messages during multiple monitoring occasions per slot.

In some cases, the downlink control channel monitoring capability includes an indication of a monitoring span gap and an indication of a monitoring span length.

In some cases, the downlink control channel monitoring capability includes a physical downlink control channel monitoring capability.

The ULCI monitoring capability component 715 may transmit, to a base station, an indication of an uplink cancellation indication (ULCI) monitoring capability.

In some examples, the ULCI monitoring capability component 715 may transmit an indication of a capability of monitoring for ULCIs during multiple monitoring occasions per slot based on the identifying.

In some cases, the indication of a capability of monitoring for ULCIs during multiple monitoring occasions per slot includes an indication of a monitoring span gap and an indication of a monitoring span length.

In some cases, the indication of the ULCI monitoring capability and the transmitted indication of the downlink control channel monitoring capability implies a capability of monitoring for ULCIs during multiple monitoring occasions per slot.

In some cases, the indication of the ULCI monitoring capability includes a capability to receive ULCIs and to cancel uplink transmissions according to the ULCIs.

The ULCI monitoring component 720 may monitor for ULCIs in monitoring occasions based on the ULCI monitoring capability.

In some examples, the ULCI monitoring component 720 may monitor for ULCIs during a set of monitoring occasions per slot.

The RRC component 725 may receive a configuration in a radio resource control message which configures the monitoring occasions based on the ULCI monitoring capability.

The PDCCH monitoring component 730 may monitor for downlink control channel messages during a single monitoring occasion per slot, where the downlink control channel messages include control signaling that is different from the ULCIs.

In some examples, the PDCCH monitoring component 730 may monitor for downlink control channel messages during a set of monitoring occasion per slot, where the downlink control channel messages include control signaling that is different from the ULCIs.

Figure 8:
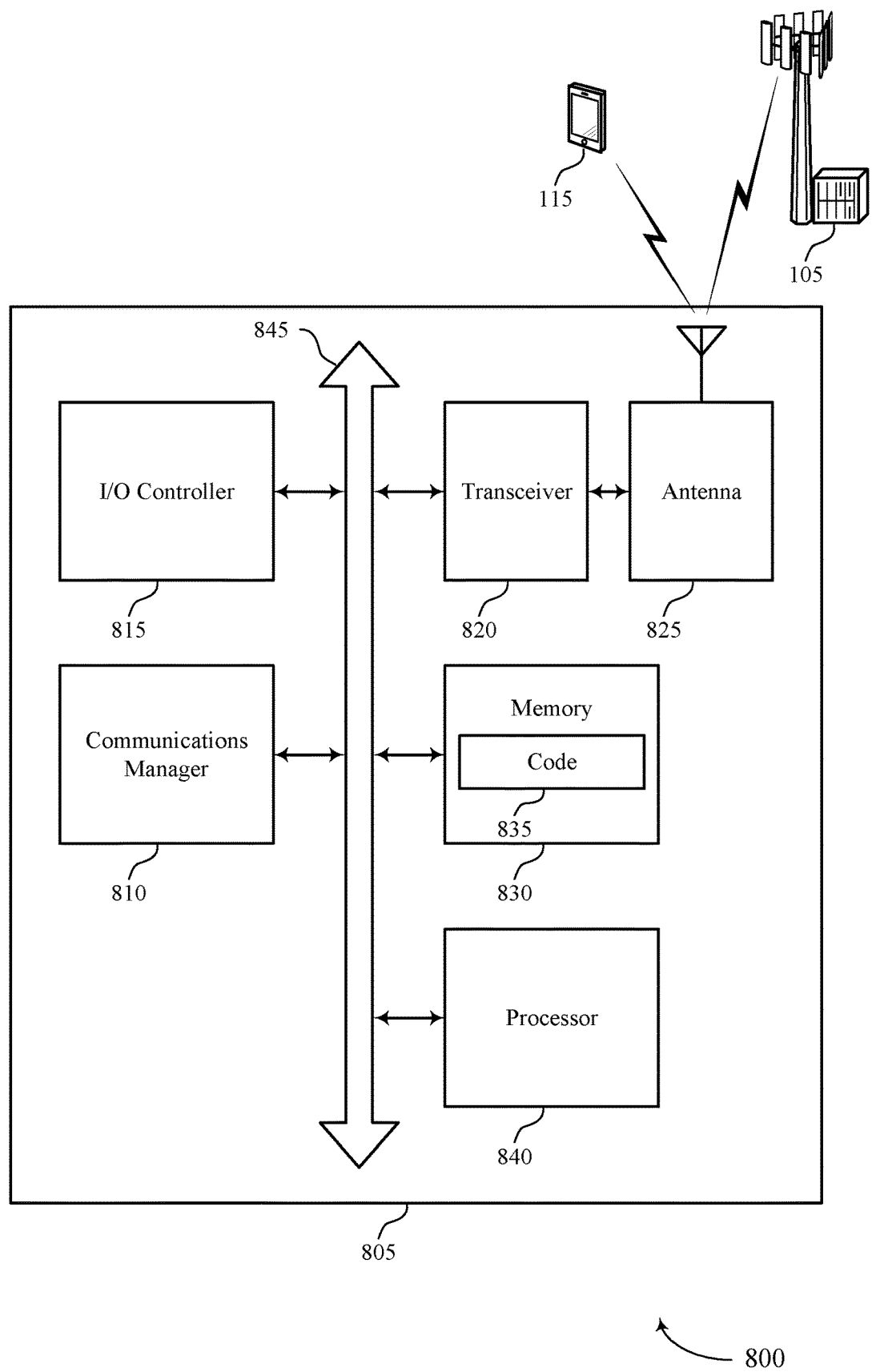
FIG. 8 shows a diagram of a system including a device that supports uplink cancellation indication capability signaling in accordance with aspects of the present disclosure.

FIG. 8 shows a diagram of a system 800 including a device 805 that supports uplink cancellation indication capability signaling in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a downlink control channel monitoring capability for the UE, transmit, to a base station, an indication of an uplink cancellation indication (ULCI) monitoring capability, and monitor for ULCIs in monitoring occasions based on the ULCI monitoring capability.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink cancellation indication capability signaling).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
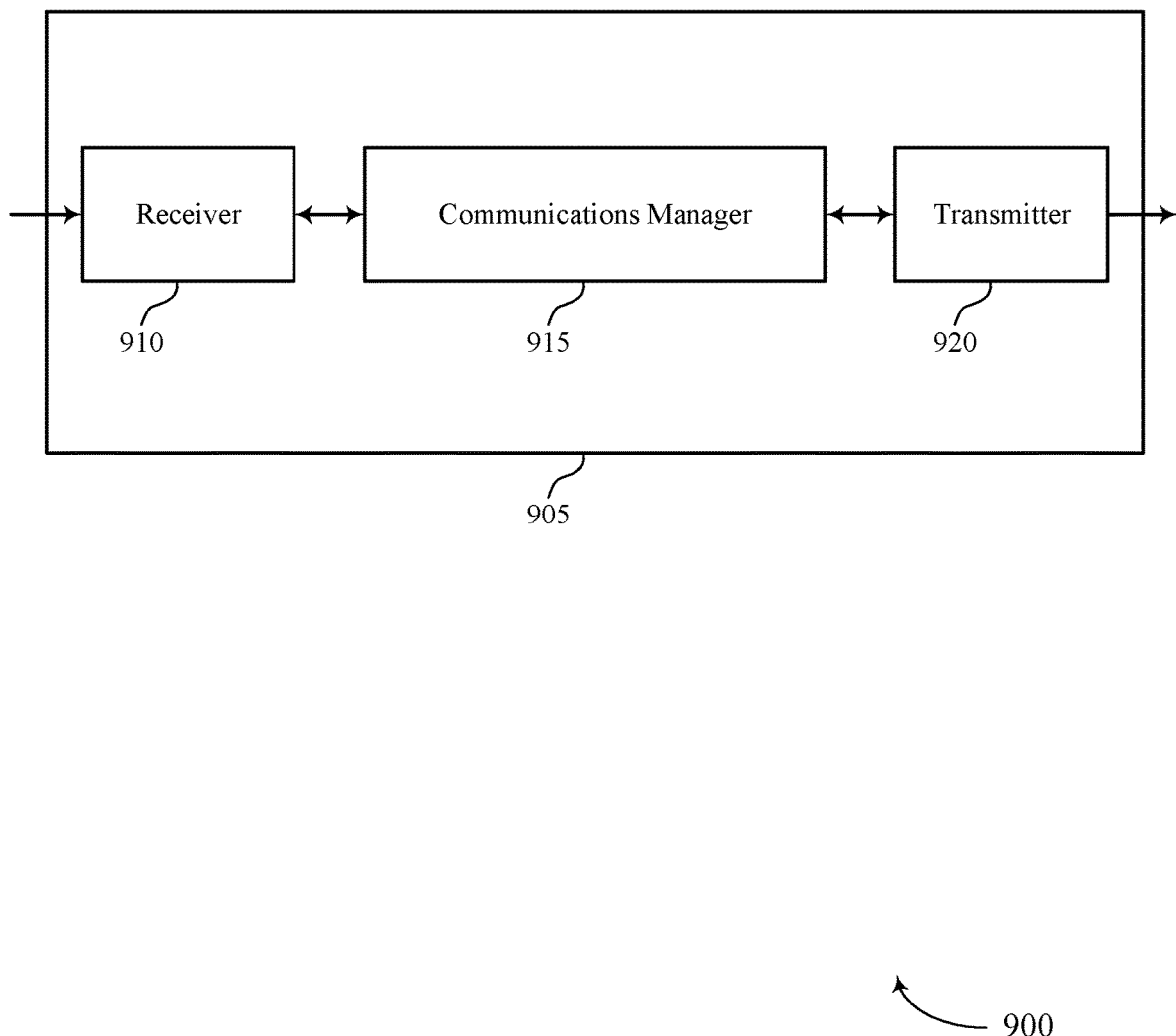
FIGS. 9 and 10 show block diagrams of devices that support uplink cancellation indication capability signaling in accordance with aspects of the present disclosure.

FIG. 9 shows a block diagram 900 of a device 905 that supports uplink cancellation indication capability signaling in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to uplink cancellation indication capability signaling, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a downlink control channel monitoring capability for a UE, receive, from the UE, an indication of an uplink cancellation indication (ULCI) monitoring capability, and configure one or more monitoring occasions for ULCIs based on the ULCI monitoring capability. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
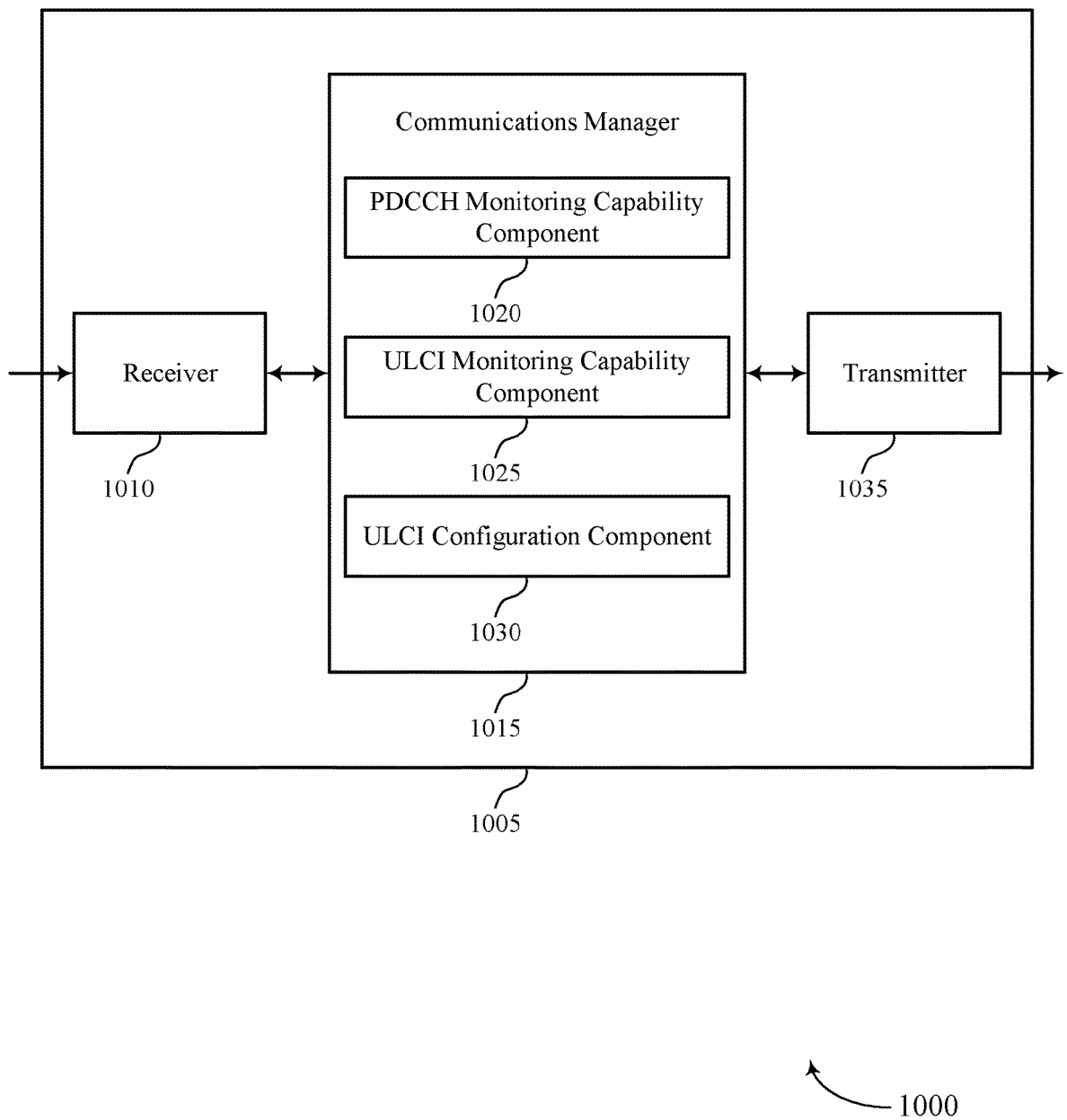

FIG. 10 shows a block diagram 1000 of a device 1005 that supports uplink cancellation indication capability signaling in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink cancellation indication capability signaling, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a PDCCH monitoring capability component 1020, an ULCI monitoring capability component 1025, and an ULCI configuration component 1030. The communications manager 1015 may be an example of aspects of the communications manager 1210 described herein.

The PDCCH monitoring capability component 1020 may identify a downlink control channel monitoring capability for a UE.

The ULCI monitoring capability component 1025 may receive, from the UE, an indication of an uplink cancellation indication (ULCI) monitoring capability.

The ULCI configuration component 1030 may configure one or more monitoring occasions for ULCIs based on the ULCI monitoring capability.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
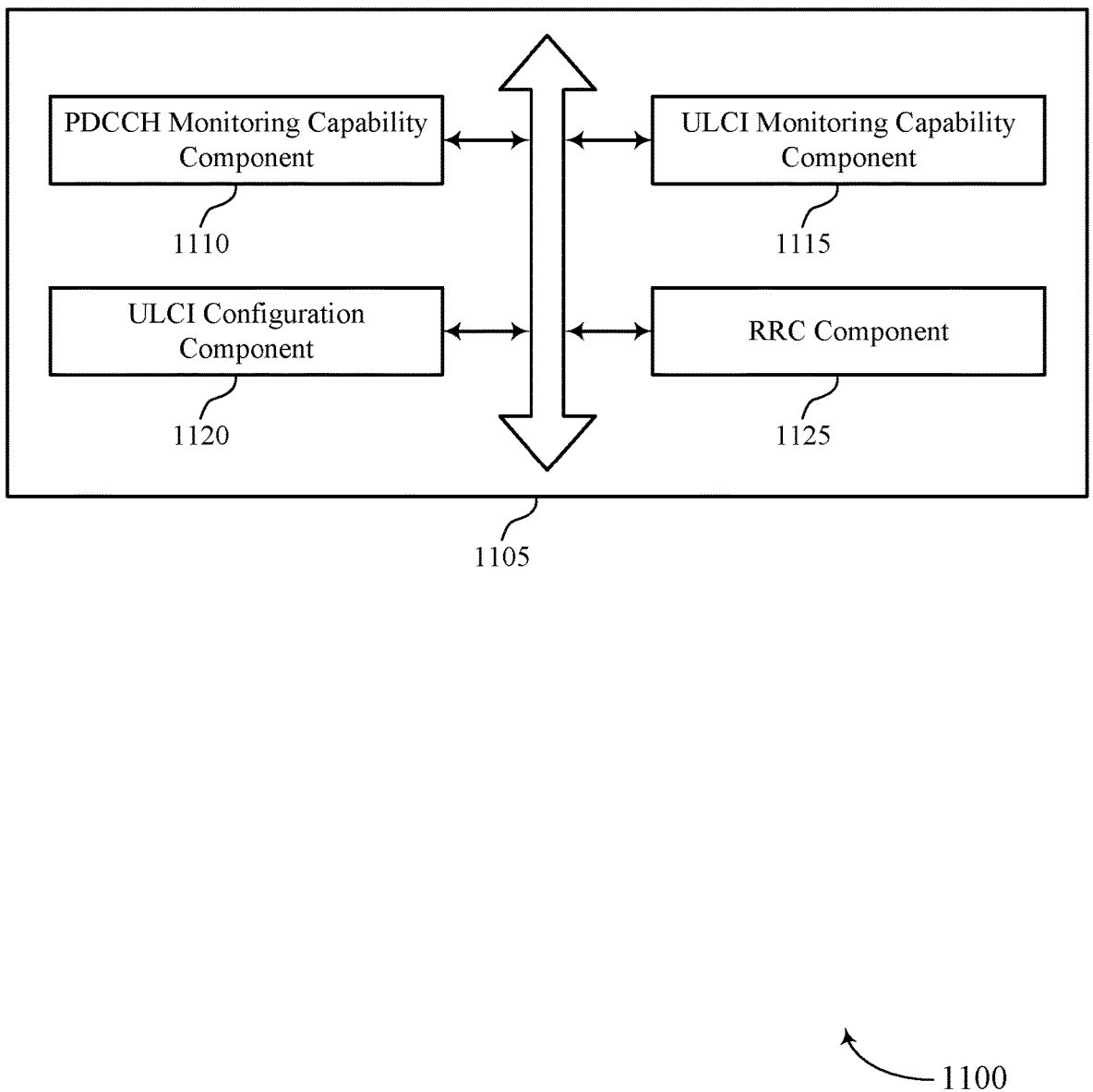
FIG. 11 shows a block diagram of a communications manager that supports uplink cancellation indication capability signaling in accordance with aspects of the present disclosure.

FIG. 11 shows a block diagram 1100 of a communications manager 1105 that supports uplink cancellation indication capability signaling in accordance with aspects of the present disclosure. The communications manager 1105 may be an example of aspects of a communications manager 915, a communications manager 1015, or a communications manager 1210 described herein. The communications manager 1105 may include a PDCCH monitoring capability component 1110, an ULCI monitoring capability component 1115, an ULCI configuration component 1120, and a RRC component 1125. Each of these modules may communicate, directly or indirectly, with one another (e.g., via one or more buses).

The PDCCH monitoring capability component 1110 may identify a downlink control channel monitoring capability for a UE.

In some examples, the PDCCH monitoring capability component 1110 may identify that the downlink control channel monitoring capability indicates a capability of monitoring for downlink control channel messages during a single monitoring occasion per slot.

In some examples, the PDCCH monitoring capability component 1110 may receive an indication of the downlink control channel monitoring capability, where the downlink control channel monitoring capability indicates a capability of monitoring for downlink control channel messages during multiple monitoring occasions per slot.

In some cases, the downlink control channel monitoring capability includes an indication of a monitoring span gap and an indication of a monitoring span length.

In some cases, the downlink control channel monitoring capability includes a physical downlink control channel monitoring capability.

The ULCI monitoring capability component 1115 may receive, from the UE, an indication of an uplink cancellation indication (ULCI) monitoring capability.

In some examples, the ULCI monitoring capability component 1115 may receive an indication of a capability of monitoring for ULCIs during multiple monitoring occasions per slot based on the identifying.

In some examples, the ULCI monitoring capability component 1115 may infer a capability of monitoring for ULCIs during multiple monitoring occasions per slot based on the received indication of the downlink control channel monitoring capability and the indication of the ULCI monitoring capability.

In some cases, the indication of a capability of monitoring for ULCIs during multiple monitoring occasions per slot includes an indication of a monitoring span gap and an indication of a monitoring span length.

In some cases, the indication of the ULCI monitoring capability includes a capability to receive ULCIs and to cancel uplink transmissions according to the ULCIs.

The ULCI configuration component 1120 may configure one or more monitoring occasions for ULCIs based on the ULCI monitoring capability.

The RRC component 1125 may transmit a configuration in a radio resource control message which configures the monitoring occasions based on the ULCI monitoring capability.

Figure 12:
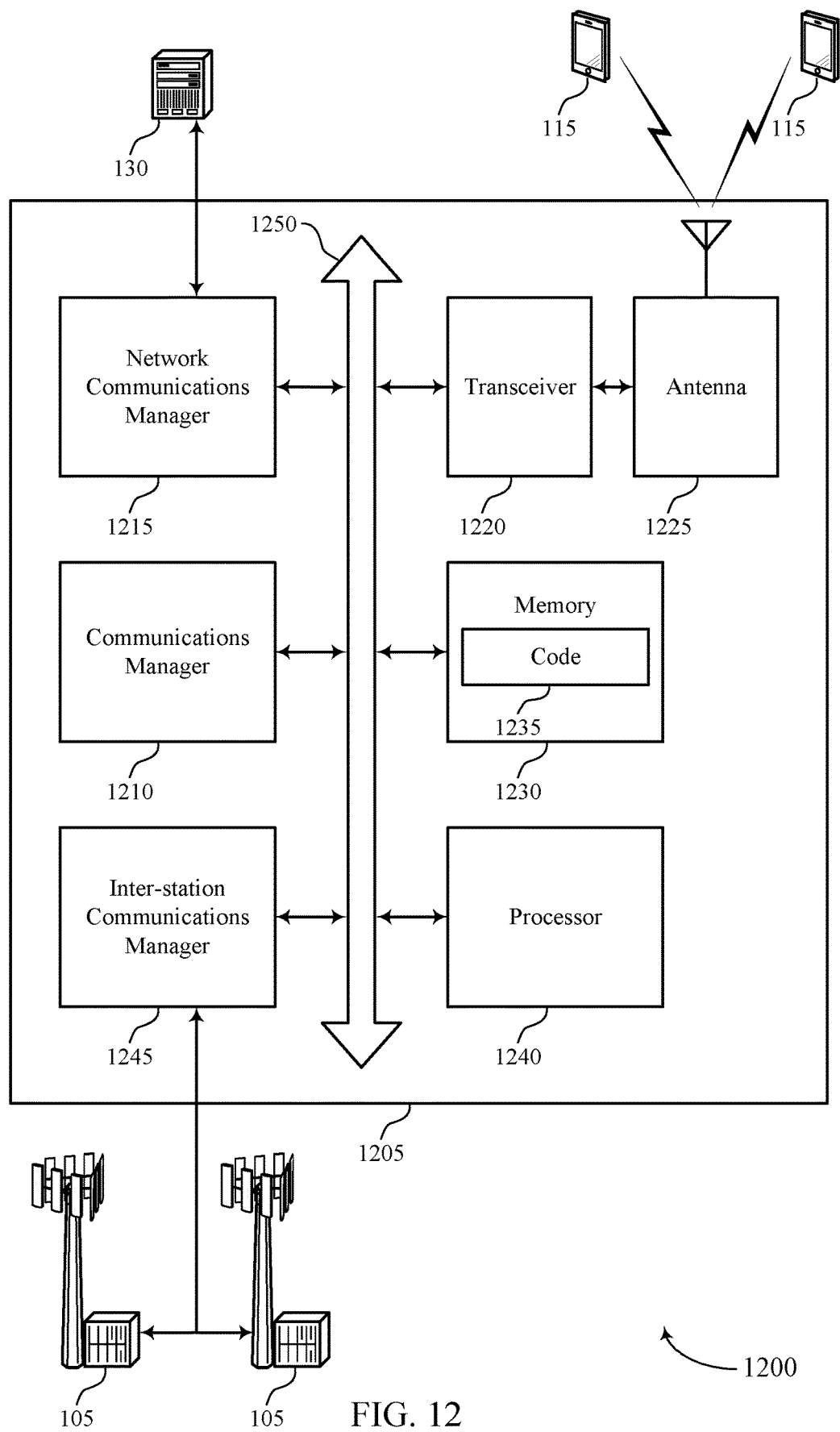
FIG. 12 shows a diagram of a system including a device that supports uplink cancellation indication capability signaling in accordance with aspects of the present disclosure.

FIG. 12 shows a diagram of a system 1200 including a device 1205 that supports uplink cancellation indication capability signaling in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a downlink control channel monitoring capability for a UE, receive, from the UE, an indication of an uplink cancellation indication (ULCI) monitoring capability, and configure one or more monitoring occasions for ULCIs based on the ULCI monitoring capability.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting uplink cancellation indication capability signaling).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
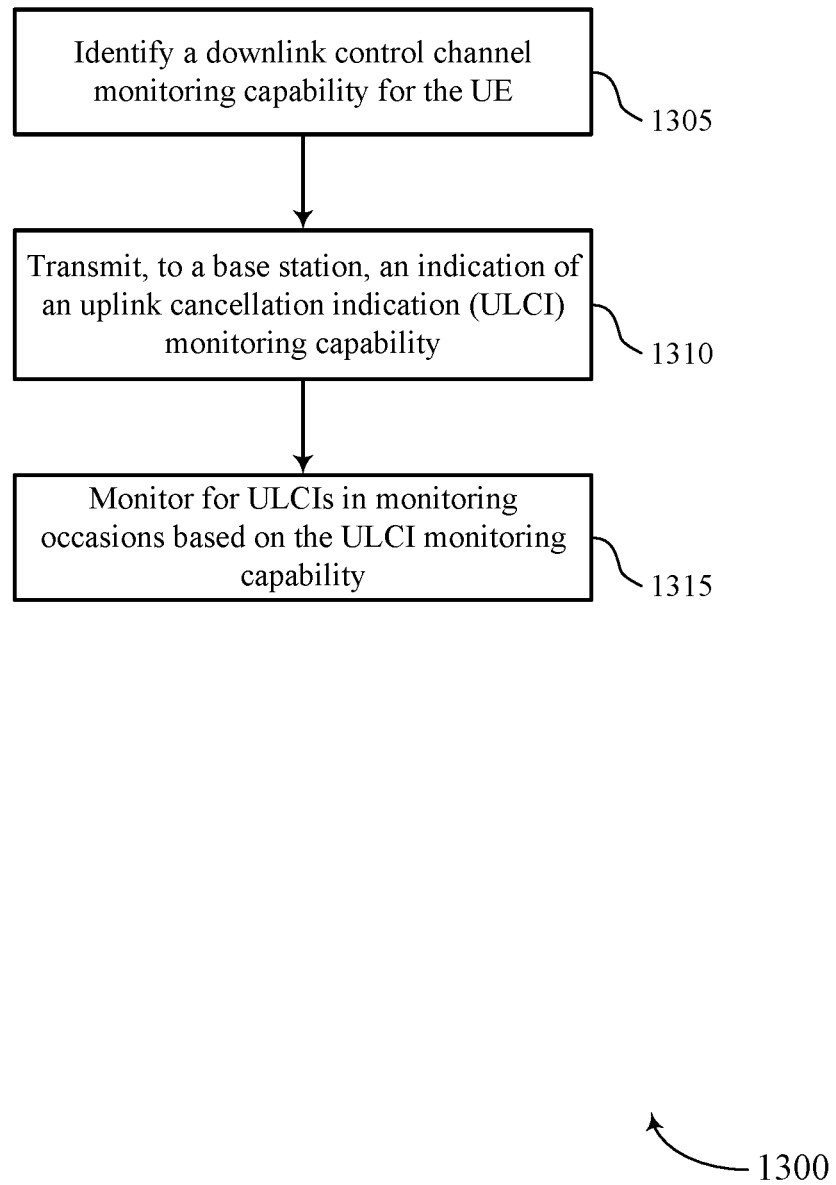
FIGS. 13 through 17 show flowcharts illustrating methods that support uplink cancellation indication capability signaling in accordance with aspects of the present disclosure.

FIG. 13 shows a flowchart illustrating a method 1300 that supports uplink cancellation indication capability signaling in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify a downlink control channel monitoring capability for the UE. The operations of 1305 may be performed according to the methods described herein. In some examples, aspects of the operations of 1305 may be performed by a PDCCH monitoring capability component as described with reference to FIGS. 5 through 8.

At 1310, the UE may transmit, to a base station, an indication of an uplink cancellation indication (ULCI) monitoring capability. The operations of 1310 may be performed according to the methods described herein. In some examples, aspects of the operations of 1310 may be performed by an ULCI monitoring capability component as described with reference to FIGS. 5 through 8.

At 1315, the UE may monitor for ULCIs in monitoring occasions based on the ULCI monitoring capability. The operations of 1315 may be performed according to the methods described herein. In some examples, aspects of the operations of 1315 may be performed by an ULCI monitoring component as described with reference to FIGS. 5 through 8.

Figure 14:
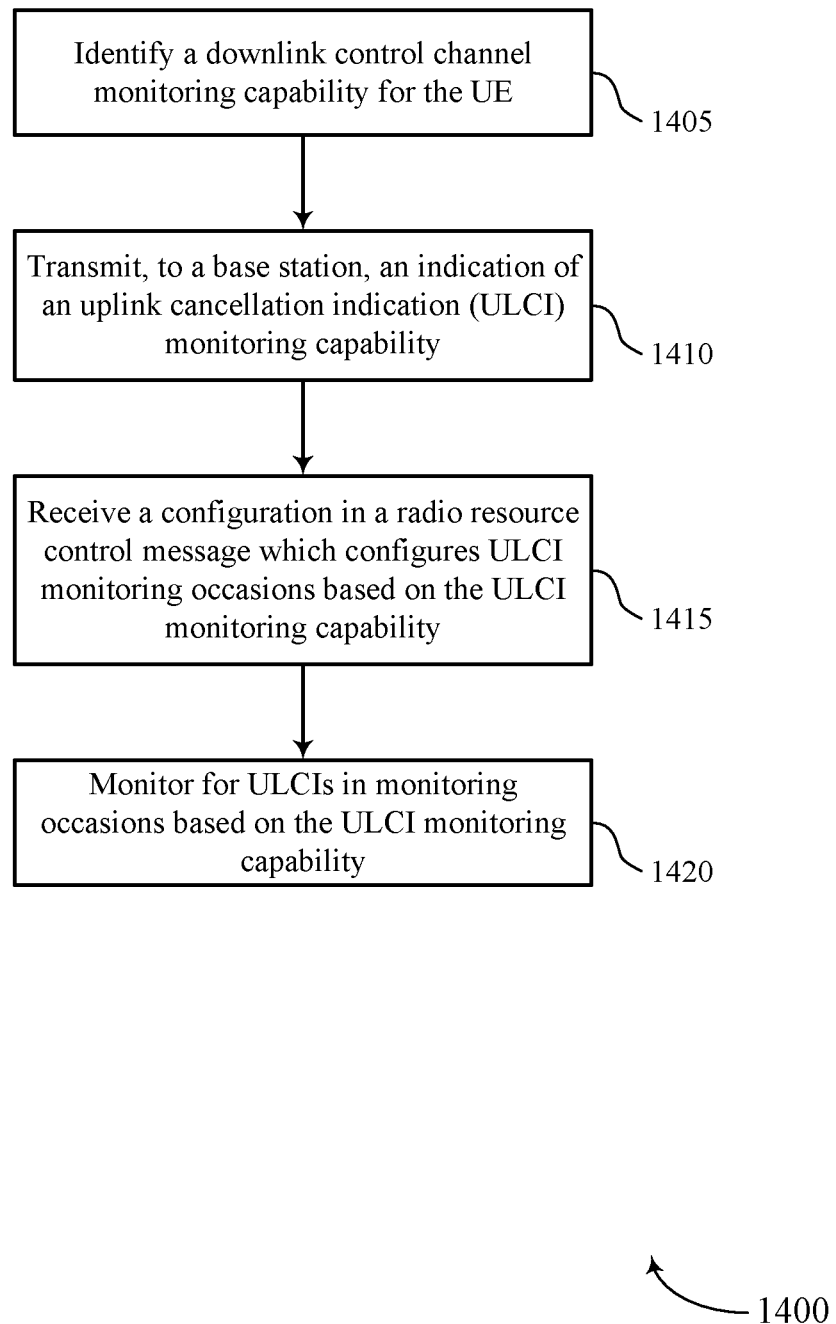

FIG. 14 shows a flowchart illustrating a method 1400 that supports uplink cancellation indication capability signaling in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may identify a downlink control channel monitoring capability for the UE. The operations of 1405 may be performed according to the methods described herein. In some examples, aspects of the operations of 1405 may be performed by a PDCCH monitoring capability component as described with reference to FIGS. 5 through 8.

At 1410, the UE may transmit, to a base station, an indication of an uplink cancellation indication (ULCI) monitoring capability. The operations of 1410 may be performed according to the methods described herein. In some examples, aspects of the operations of 1410 may be performed by an ULCI monitoring capability component as described with reference to FIGS. 5 through 8.

At 1415, the UE may receive a configuration in a radio resource control message which configures the monitoring occasions based on the ULCI monitoring capability. The operations of 1415 may be performed according to the methods described herein. In some examples, aspects of the operations of 1415 may be performed by a RRC component as described with reference to FIGS. 5 through 8.

At 1420, the UE may monitor for ULCIs in monitoring occasions based on the ULCI monitoring capability. The operations of 1420 may be performed according to the methods described herein. In some examples, aspects of the operations of 1420 may be performed by an ULCI monitoring component as described with reference to FIGS. 5 through 8.

Figure 15:
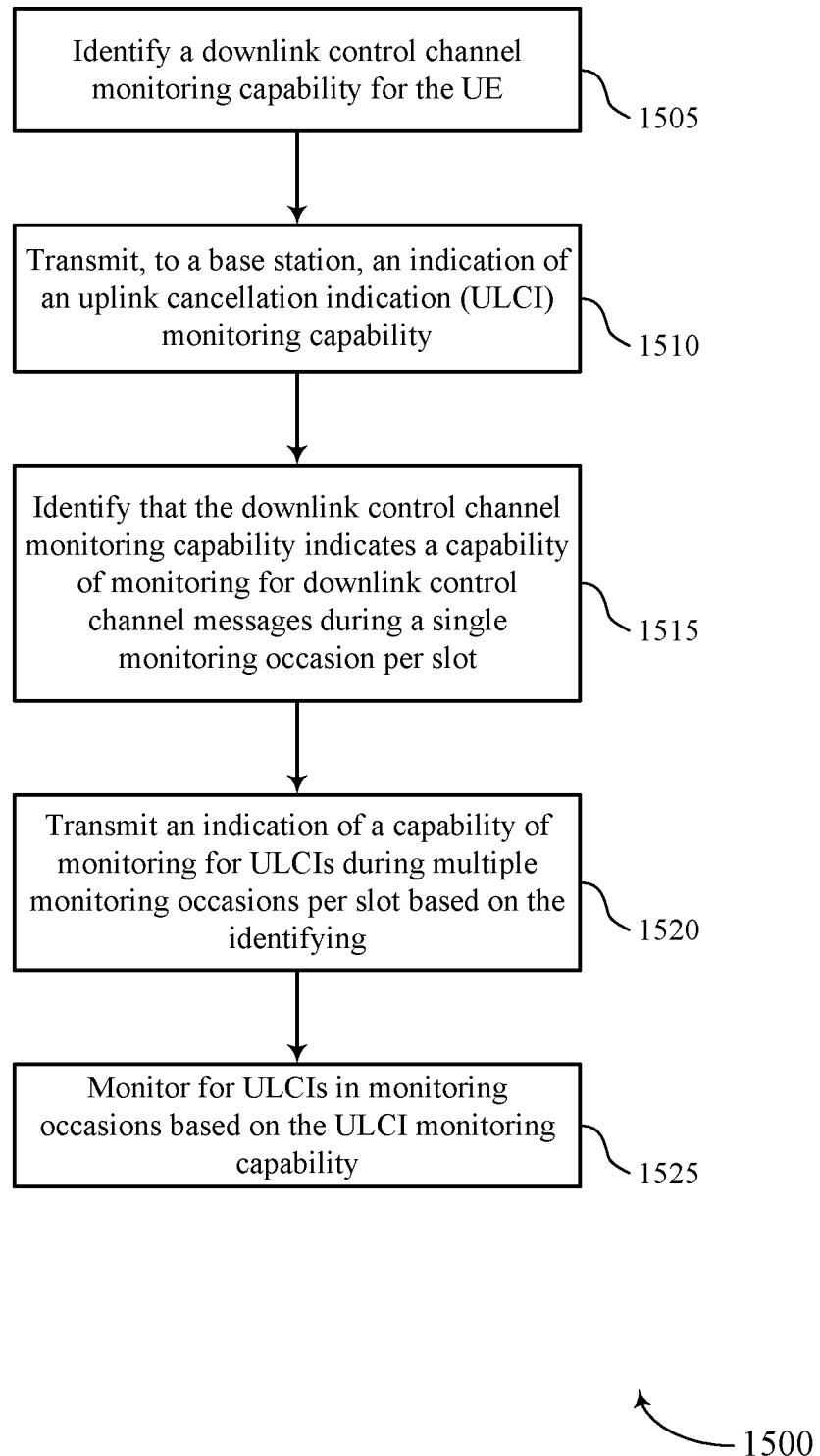

FIG. 15 shows a flowchart illustrating a method 1500 that supports uplink cancellation indication capability signaling in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may identify a downlink control channel monitoring capability for the UE. The operations of 1505 may be performed according to the methods described herein. In some examples, aspects of the operations of 1505 may be performed by a PDCCH monitoring capability component as described with reference to FIGS. 5 through 8.

At 1510, the UE may transmit, to a base station, an indication of an uplink cancellation indication (ULCI) monitoring capability. The operations of 1510 may be performed according to the methods described herein. In some examples, aspects of the operations of 1510 may be performed by an ULCI monitoring capability component as described with reference to FIGS. 5 through 8.

At 1515, the UE may identify that the downlink control channel monitoring capability indicates a capability of monitoring for downlink control channel messages during a single monitoring occasion per slot. The operations of 1515 may be performed according to the methods described herein. In some examples, aspects of the operations of 1515 may be performed by a PDCCH monitoring capability component as described with reference to FIGS. 5 through 8.

At 1520, the UE may transmit an indication of a capability of monitoring for ULCIs during multiple monitoring occasions per slot based on the identifying. The operations of 1520 may be performed according to the methods described herein. In some examples, aspects of the operations of 1520 may be performed by an ULCI monitoring capability component as described with reference to FIGS. 5 through 8.

At 1525, the UE may monitor for ULCIs in monitoring occasions based on the ULCI monitoring capability. The operations of 1525 may be performed according to the methods described herein. In some examples, aspects of the operations of 1525 may be performed by an ULCI monitoring component as described with reference to FIGS. 5 through 8.

Figure 16:
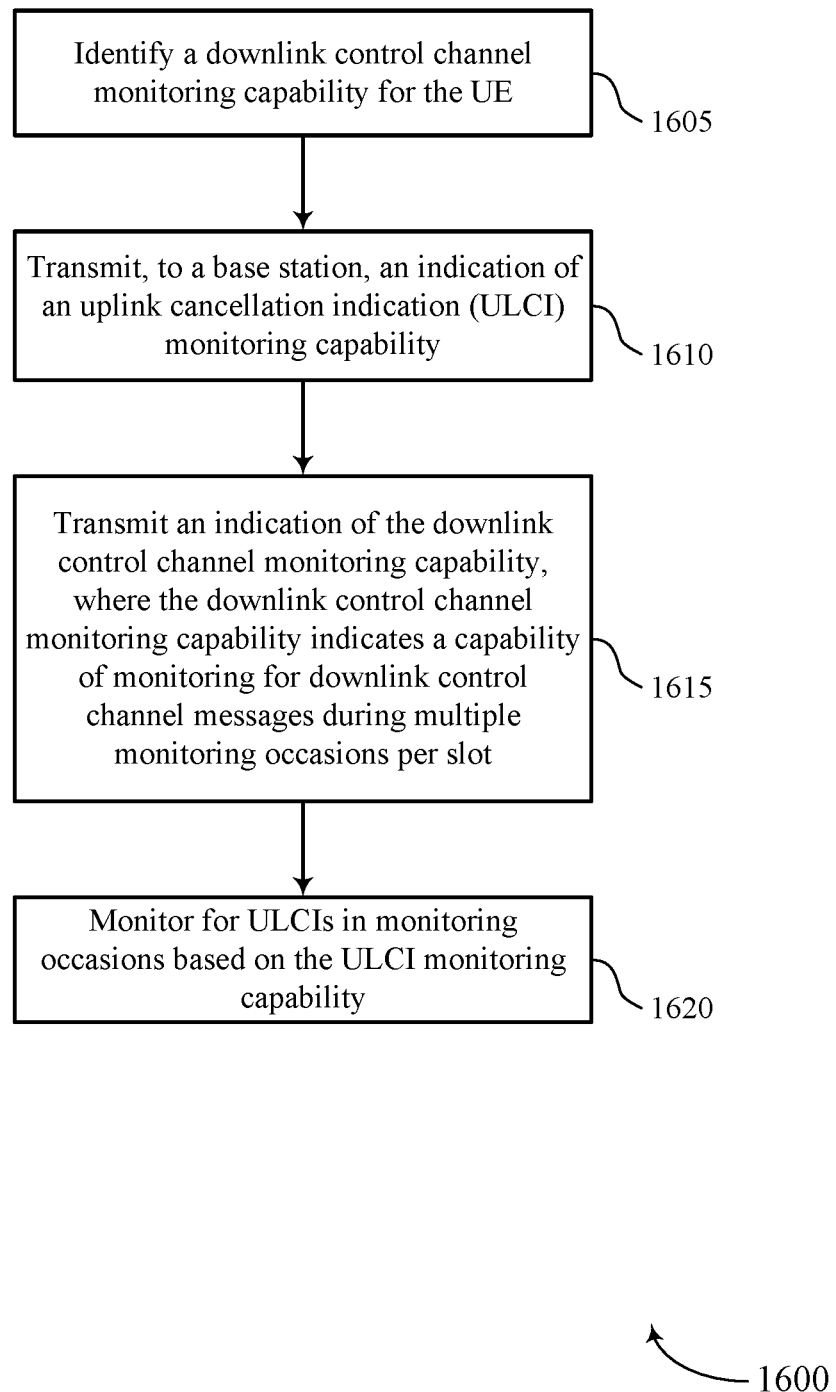

FIG. 16 shows a flowchart illustrating a method 1600 that supports uplink cancellation indication capability signaling in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may identify a downlink control channel monitoring capability for the UE. The operations of 1605 may be performed according to the methods described herein. In some examples, aspects of the operations of 1605 may be performed by a PDCCH monitoring capability component as described with reference to FIGS. 5 through 8.

At 1610, the UE may transmit, to a base station, an indication of an uplink cancellation indication (ULCI) monitoring capability. The operations of 1610 may be performed according to the methods described herein. In some examples, aspects of the operations of 1610 may be performed by an ULCI monitoring capability component as described with reference to FIGS. 5 through 8.

At 1615, the UE may transmit an indication of the downlink control channel monitoring capability, where the downlink control channel monitoring capability indicates a capability of monitoring for downlink control channel messages during multiple monitoring occasions per slot. The operations of 1615 may be performed according to the methods described herein. In some examples, aspects of the operations of 1615 may be performed by a PDCCH monitoring capability component as described with reference to FIGS. 5 through 8.

At 1620, the UE may monitor for ULCIs in monitoring occasions based on the ULCI monitoring capability. The operations of 1620 may be performed according to the methods described herein. In some examples, aspects of the operations of 1620 may be performed by an ULCI monitoring component as described with reference to FIGS. 5 through 8.

Figure 17:
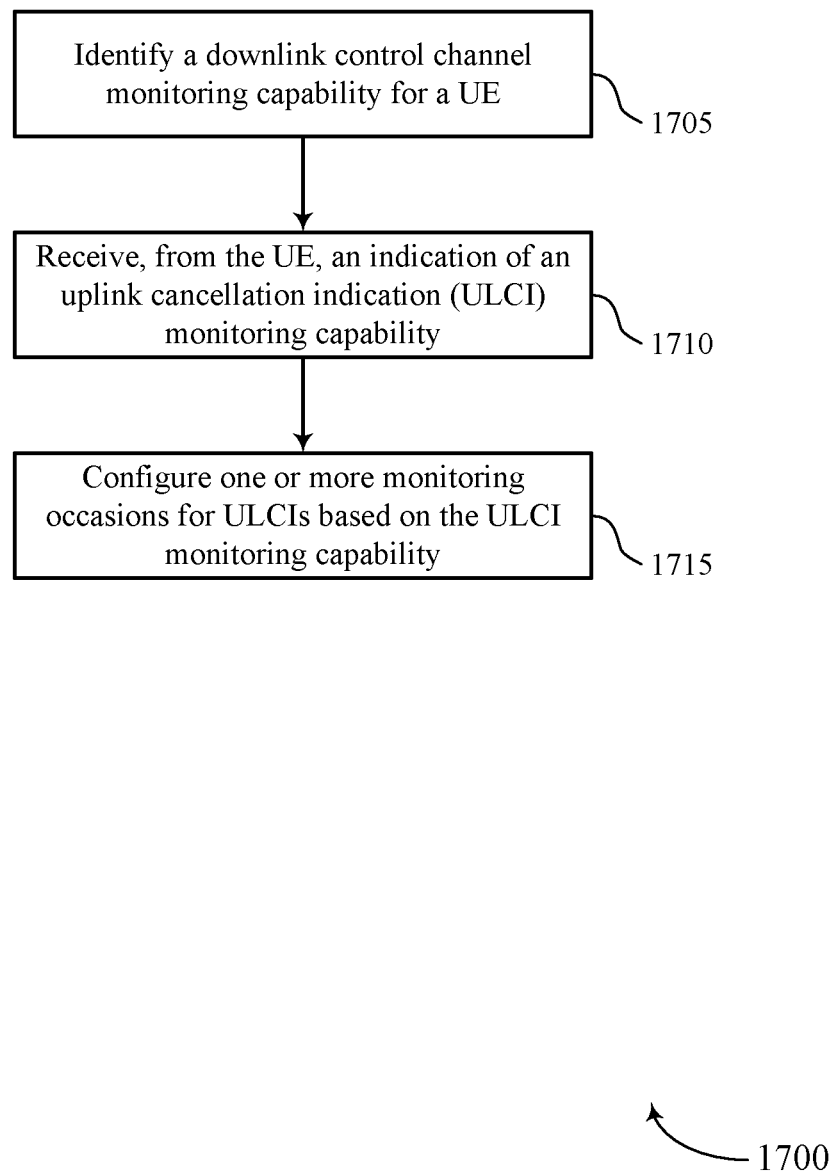

FIG. 17 shows a flowchart illustrating a method 1700 that supports uplink cancellation indication capability signaling in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may identify a downlink control channel monitoring capability for a UE. The operations of 1705 may be performed according to the methods described herein. In some examples, aspects of the operations of 1705 may be performed by a PDCCH monitoring capability component as described with reference to FIGS. 9 through 12.

At 1710, the base station may receive, from the UE, an indication of an uplink cancellation indication (ULCI) monitoring capability. The operations of 1710 may be performed according to the methods described herein. In some examples, aspects of the operations of 1710 may be performed by an ULCI monitoring capability component as described with reference to FIGS. 9 through 12.

At 1715, the base station may configure one or more monitoring occasions for ULCIs based on the ULCI monitoring capability. The operations of 1715 may be performed according to the methods described herein. In some examples, aspects of the operations of 1715 may be performed by an ULCI configuration component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
identifying a downlink control channel monitoring capability for the UE;
transmitting, to a base station, an indication of an uplink cancellation indication (ULCI) monitoring capability; and
monitoring for ULCIs in monitoring occasions based at least in part on the ULCI monitoring capability.

2. The method of claim 1, further comprising:
receiving a configuration in a radio resource control message which configures ULCI monitoring occasions based at least in part on the ULCI monitoring capability.

3. The method of claim 1, further comprising:
identifying that the downlink control channel monitoring capability indicates a capability of monitoring for downlink control channel messages during a single monitoring occasion per slot; and
transmitting an indication of a capability of monitoring for ULCIs during multiple monitoring occasions per slot based at least in part on the identifying.

4. The method of claim 3, wherein the indication of a capability of monitoring for ULCIs during multiple monitoring occasions per slot comprises an indication of a monitoring span gap and an indication of a monitoring span length.

5. The method of claim 3, further comprising:
monitoring for ULCIs during a plurality of monitoring occasions per slot; and
monitoring for downlink control channel messages during a single monitoring occasion per slot, wherein the downlink control channel messages comprise control signaling that is different from the ULCIs.

6. The method of claim 1, further comprising:
transmitting an indication of the downlink control channel monitoring capability, wherein the downlink control channel monitoring capability indicates a capability of monitoring for downlink control channel messages during multiple monitoring occasions per slot.

7. The method of claim 6, wherein the indication of the ULCI monitoring capability and the transmitted indication of the downlink control channel monitoring capability implies a capability of monitoring for ULCIs during multiple monitoring occasions per slot.

8. The method of claim 6, further comprising:
monitoring for ULCIs during a plurality of monitoring occasions per slot; and
monitoring for downlink control channel messages during a plurality of monitoring occasion per slot, wherein the downlink control channel messages comprise control signaling that is different from the ULCIs.

9. The method of claim 6, wherein the downlink control channel monitoring capability comprises an indication of a monitoring span gap and an indication of a monitoring span length.

10. The method of claim 1, wherein the downlink control channel monitoring capability comprises a physical downlink control channel monitoring capability.

11. The method of claim 1, wherein the indication of the ULCI monitoring capability comprises a capability to receive ULCIs and to cancel uplink transmissions according to the ULCIs.

12. A method for wireless communications at a base station, comprising:
identifying a downlink control channel monitoring capability for a user equipment (UE);
receiving, from the UE, an indication of an uplink cancellation indication (ULCI) monitoring capability; and
configuring one or more monitoring occasions for ULCIs based at least in part on the ULCI monitoring capability.

13. The method of claim 12, further comprising:
transmitting a configuration in a radio resource control message which configures ULCI monitoring occasions based at least in part on the ULCI monitoring capability.

14. The method of claim 12, further comprising:
identifying that the downlink control channel monitoring capability indicates a capability of monitoring for downlink control channel messages during a single monitoring occasion per slot; and
receiving an indication of a capability of monitoring for ULCIs during multiple monitoring occasions per slot based at least in part on the identifying.

15. The method of claim 14, wherein the indication of a capability of monitoring for ULCIs during multiple monitoring occasions per slot comprises an indication of a monitoring span gap and an indication of a monitoring span length.

16. The method of claim 12, further comprising:
receiving an indication of the downlink control channel monitoring capability, wherein the downlink control channel monitoring capability indicates a capability of monitoring for downlink control channel messages during multiple monitoring occasions per slot.

17. The method of claim 16, further comprising:
inferring a capability of monitoring for ULCIs during multiple monitoring occasions per slot based at least in part on the received indication of the downlink control channel monitoring capability and the indication of the ULCI monitoring capability.

18. The method of claim 16, wherein the downlink control channel monitoring capability comprises an indication of a monitoring span gap and an indication of a monitoring span length.

19. The method of claim 12, wherein the downlink control channel monitoring capability comprises a physical downlink control channel monitoring capability.

20. The method of claim 12, wherein the indication of the ULCI monitoring capability comprises a capability to receive ULCIs and to cancel uplink transmissions according to the ULCIs.

21. An apparatus for wireless communications at a user equipment (UE), comprising:
a processor,
memory in electronic communication with the processor; and
instructions stored in the memory, wherein the instructions are executable by the processor to:
identify a downlink control channel monitoring capability for the UE;

transmit, to a base station, an indication of an uplink cancellation indication (ULCI) monitoring capability; and monitor for ULCIs in monitoring occasions based at least in part on the ULCI monitoring capability.

22. The apparatus of claim 21, wherein the instructions are further executable by the processor to:

identify that the downlink control channel monitoring capability indicates a capability of monitoring for downlink control channel messages during a single monitoring occasion per slot; and transmit an indication of a capability of monitoring for ULCIs during multiple monitoring occasions per slot based at least in part on the identifying.

23. The apparatus of claim 22, wherein the indication of a capability of monitoring for ULCIs during multiple monitoring occasions per slot comprises an indication of a monitoring span gap and an indication of a monitoring span length.

24. The apparatus of claim 21, wherein the instructions are further executable by the processor to:

transmit an indication of the downlink control channel monitoring capability, wherein the downlink control channel monitoring capability indicates a capability of monitoring for downlink control channel messages during multiple monitoring occasions per slot.

25. The apparatus of claim 24, wherein the indication of the ULCI monitoring capability and the transmitted indication of the downlink control channel monitoring capability implies a capability of monitoring for ULCIs during multiple monitoring occasions per slot.

26. An apparatus for wireless communications at a base station, comprising:

a processor, memory in electronic communication with the processor; and instructions stored in the memory, wherein the instructions are executable by the processor to:

identify a downlink control channel monitoring capability for a user equipment (UE);

receive, from the UE, an indication of an uplink cancellation indication (ULCI) monitoring capability; and configure one or more monitoring occasions for ULCIs based at least in part on the ULCI monitoring capability.

27. The apparatus of claim 26, wherein the instructions are further executable by the processor to:

identify that the downlink control channel monitoring capability indicates a capability of monitoring for downlink control channel messages during a single monitoring occasion per slot; and receive an indication of a capability of monitoring for ULCIs during multiple monitoring occasions per slot based at least in part on the identifying.

28. The apparatus of claim 27, wherein the indication of a capability of monitoring for ULCIs during multiple monitoring occasions per slot comprises an indication of a monitoring span gap and an indication of a monitoring span length.

29. The apparatus of claim 26, wherein the instructions are further executable by the processor to:

receive an indication of the downlink control channel monitoring capability, wherein the downlink control channel monitoring capability indicates a capability of monitoring for downlink control channel messages during multiple monitoring occasions per slot.

30. The apparatus of claim 29, wherein the instructions are further executable by the processor to:

infer a capability of monitoring for ULCIs during multiple monitoring occasions per slot based at least in part on the received indication of the downlink control channel monitoring capability and the indication of the ULCI monitoring capability.

* * * * *